US012179528B1

(12) United States Patent
Wilson et al.

(10) Patent No.: US 12,179,528 B1
(45) Date of Patent: Dec. 31, 2024

(54) DEPTH SENSING WATERSPORT VEHICLE TRAILER

(71) Applicant: Malibu Boats, LLC, Loudon, TN (US)

(72) Inventors: James Darryl Wilson, Maryville, TN (US); Derrick Wayne Bowerman, Knoxville, TN (US); Cory Wade Duggar, Maryville, TN (US); Donna Jean Tallent, Greenback, TN (US); Rachael Marie Green, Loudon, TN (US)

(73) Assignee: Malibu Boats, LLC, Loudon, TN (US)

(*) Notice: Subject to any disclaimer, the term of this patent is extended or adjusted under 35 U.S.C. 154(b) by 648 days.

(21) Appl. No.: 17/334,408

(22) Filed: May 28, 2021

Related U.S. Application Data

(60) Provisional application No. 63/033,027, filed on Jun. 1, 2020.

(51) Int. Cl.
B60D 1/24 (2006.01)
B60D 1/00 (2006.01)
B60D 1/06 (2006.01)
B60D 1/62 (2006.01)
B60Q 1/34 (2006.01)
B60Q 1/44 (2006.01)
B60Q 9/00 (2006.01)
B63B 13/00 (2006.01)
B63B 79/10 (2020.01)
B63B 79/40 (2020.01)
(Continued)

(52) U.S. Cl.
CPC ............. B60D 1/24 (2013.01); B60D 1/06 (2013.01); B60D 1/62 (2013.01); B60Q 1/34 (2013.01); B60Q 1/44 (2013.01); B60Q 9/00 (2013.01); B63B 13/00 (2013.01); B63B 79/10 (2020.01); B63B 79/40 (2020.01); G01F 23/30 (2013.01); B60D 2001/001 (2013.01); H04W 88/02 (2013.01)

(58) Field of Classification Search
CPC ... B60D 1/24; B60D 1/06; B60D 1/62; B60D 2001/001; B63B 79/40; B63B 79/10; B63B 13/00; B60Q 1/34; B60Q 1/44; B60Q 9/00; G01F 23/30; H04W 88/02
See application file for complete search history.

(56) References Cited

U.S. PATENT DOCUMENTS 3,086,752 A 4/1963 Wetter
3,821,699 A * 6/1974 Marus et al. ........ G01C 13/008
200/61.04
(Continued)

OTHER PUBLICATIONS

*Malibu Trailers*, Malibu Boats 2020 Catalog, p. 38, available Nov. 2019.

(Continued)

*Primary Examiner* — Luis A Martinez Borrero
(74) *Attorney, Agent, or Firm* — Knobbe, Martens, Olson & Bear, LLP

(57) ABSTRACT

A trailer for towing a watersport vehicle that includes a depth sensor. The depth sensor can detect when the trailer is within a suitable depth of water to launch and/or retrieve the watersport vehicle. The trailer can include one or more sensors to assist in positioning the watersport vehicle on the trailer. Use of the trailer can enable a user to efficiently and properly load and unload the watersport vehicle onto and from the trailer.

28 Claims, 19 Drawing Sheets

(51) Int. Cl.
  *G01F 23/30* (2006.01)
  *H04W 88/02* (2009.01)

(56) References Cited

U.S. PATENT DOCUMENTS

| | | | |
|---|---|---|---|
| 3,995,251 A | 11/1976 | Jones | |
| 4,529,217 A * | 7/1985 | Wood | B60P 3/1075 |
| | | | 414/529 |
| 4,895,387 A * | 1/1990 | Hawkins | B60P 3/1033 |
| | | | 280/414.1 |
| 4,940,251 A | 7/1990 | Willmsen | |
| 5,013,206 A | 5/1991 | Ernst et al. | |
| 5,097,250 A * | 3/1992 | Hernandez | B62D 15/02 |
| | | | 340/440 |
| 5,396,857 A * | 3/1995 | Emery, Jr. | B60Q 1/52 |
| | | | 280/414.1 |
| 5,596,944 A * | 1/1997 | Massie | B60Q 1/503 |
| | | | 116/28 R |
| 5,634,761 A * | 6/1997 | Carrick | B60P 3/1066 |
| | | | 414/529 |
| D387,325 S * | 12/1997 | Deveau | D12/300 |
| 5,850,175 A * | 12/1998 | Yeilding | G01F 23/36 |
| | | | 73/317 |
| 5,949,329 A | 9/1999 | Woodard | |
| 7,017,933 B2 | 3/2006 | Mickley | |
| 7,055,449 B2 * | 6/2006 | Brown | B63C 1/10 |
| | | | 114/344 |
| 7,219,914 B2 | 5/2007 | Huddleston | |
| 7,281,728 B1 * | 10/2007 | Wayrynen | B60P 3/1066 |
| | | | 280/414.1 |
| 7,425,012 B1 | 9/2008 | Sease | |
| 7,523,952 B1 * | 4/2009 | Spears, Jr. | B60P 3/1075 |
| | | | 114/344 |
| 7,876,234 B1 | 1/2011 | Spears, Jr. | |
| 8,403,353 B2 | 3/2013 | Fink | |
| D737,178 S * | 8/2015 | Crane | D12/101 |
| 9,127,940 B2 * | 9/2015 | Nirenberg | B60P 3/1033 |
| 9,395,459 B2 * | 7/2016 | Bittleston | G01V 1/3808 |
| 9,694,873 B2 * | 7/2017 | Gasper | B63B 1/32 |
| 9,707,964 B2 * | 7/2017 | Di Miro | B60W 30/18009 |
| 9,821,808 B1 * | 11/2017 | Abbas | B62D 15/027 |
| 9,904,293 B1 * | 2/2018 | Heap | G05D 1/12 |
| 9,987,964 B1 * | 6/2018 | Napier | B60P 3/1033 |
| 10,583,768 B2 * | 3/2020 | Thorley | B60P 1/00 |
| 10,730,425 B2 * | 8/2020 | Yanyk | B60P 3/1075 |
| 11,135,881 B2 | 10/2021 | Hall et al. | |
| 11,198,494 B2 * | 12/2021 | Derginer | B63H 20/12 |
| 11,351,907 B2 * | 6/2022 | Wright, III | G01S 13/867 |
| 11,505,118 B2 | 11/2022 | Boone et al. | |
| 11,772,560 B2 * | 10/2023 | Lynema | B60R 1/23 |
| | | | 348/148 |
| 11,904,996 B2 * | 2/2024 | Derginer | G05D 1/0875 |
| 2003/0137124 A1 * | 7/2003 | Marchese | B60P 3/1075 |
| | | | 280/414.1 |
| 2004/0211351 A1 | 10/2004 | Emerson et al. | |
| 2005/0275288 A1 * | 12/2005 | Miller | B60P 3/1033 |
| | | | 307/10.1 |
| 2008/0023937 A1 * | 1/2008 | Bryant | B60P 3/1066 |
| | | | 280/414.1 |
| 2008/0117030 A1 * | 5/2008 | Medina | B60Q 9/00 |
| | | | 701/1 |
| 2010/0207356 A1 * | 8/2010 | Pottorff | B60D 1/06 |
| | | | 280/412 |
| 2011/0018724 A1 * | 1/2011 | Little | B60P 3/1075 |
| | | | 340/618 |
| 2014/0062179 A1 * | 3/2014 | Torell | B60R 16/03 |
| | | | 307/9.1 |
| 2014/0091938 A1 | 4/2014 | Nirenberg | |
| 2016/0264220 A1 * | 9/2016 | Laceky | B60P 3/1075 |
| 2017/0341583 A1 * | 11/2017 | Zhang | H04N 7/181 |
| 2018/0072390 A1 * | 3/2018 | Hartman | B63B 34/70 |
| 2018/0215394 A1 * | 8/2018 | Trageser | B60P 3/1033 |
| 2019/0152575 A1 * | 5/2019 | Hartman | B63B 79/10 |
| 2019/0256177 A1 * | 8/2019 | Hartman | B63B 11/04 |
| 2020/0017013 A1 * | 1/2020 | Records | B60P 3/1066 |
| 2020/0062356 A1 * | 2/2020 | Hartman | B63B 34/70 |
| 2020/0094738 A1 * | 3/2020 | Lane | B60T 7/20 |
| 2020/0102009 A1 * | 4/2020 | Owen | B62D 15/028 |
| 2021/0031668 A1 * | 2/2021 | French | B62D 21/20 |
| 2021/0053657 A1 * | 2/2021 | Hartman | B63B 34/70 |
| 2021/0061422 A1 * | 3/2021 | Hartman | B63B 34/70 |
| 2021/0070403 A1 * | 3/2021 | Hartman | B63J 3/02 |
| 2021/0229589 A1 * | 7/2021 | Wright, III | G01F 23/00 |
| 2021/0253202 A1 * | 8/2021 | Hartman | B63B 32/20 |
| 2022/0363195 A1 * | 11/2022 | Lynema | B60P 3/1075 |
| 2023/0063012 A1 * | 3/2023 | Hartman | B63B 34/70 |
| 2023/0219678 A1 * | 7/2023 | Rezac | B63C 13/00 |
| | | | 701/1 |

OTHER PUBLICATIONS

*Bilge Alert High Water Alarm*, Instruction Manual, SPXFLOW, Johnson Pump, dated Jan. 2019.

*Customize Your Trailer*, https://www.malibuboats.com/, available Jul. 23, 2019.

* cited by examiner

DEPTH SENSING WATERSPORT VEHICLE TRAILER

CROSS REFERENCE TO RELATED APPLICATIONS

This application claims priority to U.S. Provisional Patent Application No. 63/033,027, filed Jun. 1, 2020, which is incorporated herein by reference in its entirety. Any and all applications, if any, for which a foreign or domestic priority claim is identified in the Application Data Sheet of the present application are hereby incorporated by reference under 37 CFR 1.57.

FIELD

The present application relates generally to improving loading and unloading a watersport vehicle from a trailer.

BACKGROUND

Water sports that utilize a watersport boat, including wakeboarding, waterskiing, wake surfing, tubing, swimming, and the like, have become increasingly popular. More and more participants transport or otherwise launch a watersport boat to or into a body of water to enjoy water sports, activities, or simply use of the boat. In many cases, a participant tows a watersport boat to the body of water using a trailer towed by a tow vehicle, such as a truck. The user unloads the watersport boat from the trailer into the water to begin an activity and, upon concluding for the day, loads the watersport boat back onto the trailer for towing.

SUMMARY

There are challenges associated with the loading or unloading of a boat on or from a trailer or other stow or storage apparatus. For example, to unload the watersport boat from the trailer (also known as launch), a user may operate a tow vehicle to back the trailer loaded with the watersport boat down a boat ramp or other inclined surface into a body of water. The user may have difficulty knowing a depth of the trailer within the water from the driver's seat of the tow vehicle, resulting in the user repeatedly exiting the tow vehicle to verify whether the trailer is at a suitable depth and/or relying on a third party to offer guidance. For example, a driver may rely on mirrors to see a water level with respect to a partially or completely submerged wheel of a trailer. However, even seeing the water level on one side may not be indicative of the water level on the other when, for example, the inclined surface or boat ramp is crosswise unleveled. Some users, despite exiting the tow vehicle to obtain a better view, may even misjudge when the trailer is at a suitable depth. Unloading a boat with the trailer too shallow results in increased friction between boat-contacting surfaces on the trailer and the boat itself. Increased friction causes unnecessary and often costly wear on gel coats and bunker materials, just to name a few. Moreover, because too much of the weight of the boat is still supported by the boat-contacting surfaces, the driver may need to over engage the engine to get the boat to unseat from, for example, the bunkers. Unloading the boat with the trailer too deep results in insufficient contact between boat-contacting surfaces on the trailer and the boat itself. That is, the boat-contacting surfaces do more than support the boat, they often also ensure the hull is substantially centered on the trailer for safe transport. When the trailer is too deep for loading, the boat can drift off center as it may float above the bunkers. Then when the driver attempts to reverse off the trailer, the off-center boat may contact the trailer in unplanned places causing damage to the trailer and/or the gel coat.

At loading, similar challenges emerge. For example, after the user operates the tow vehicle to back the trailer without the watersport boat down the boat ramp, visibility and judgement issues again cause challenges. Further, although the hull may eventually rest on the bunkers of the trailer, it may still be difficult for the user to judge if the watersport boat is properly centered. That is, a strake or chine of the hull may improperly rest on a bunk when the aft end of the boat is just a portion of an inch to a few inches off-center. Once centered, the user can operate the tow vehicle to pull the trailer out of the water with the watersport boat loaded thereon.

Many of the foregoing drawbacks or difficulties are exacerbated with V-drive type watercraft. For example, a V-drive is generally a propulsion system for boats that includes at least two drive shafts, a gearbox, and a propeller. The engine is mounted in the rear of the boat and the first drive shaft operably connected to the engine, extends from proximate the engine toward the front of the boat. A generally center-mounted gearbox is operably connected to the first drive shaft, and operably connected to a second driveshaft extending back and down towards the rear of the boat. The non-pivoting propeller is operably connected to the second drive shaft and one or more rudders are used for steering. In this configuration, the first and second drive shafts through the gearbox generally form the letter "V," hence V-drive. With a V-drive, slow speed maneuverability with the rudder can be challenging, particularly when precise handing is preferred, like when trailering the boat.

Various embodiments of a depth-sensing water sport vehicle trailer are described herein. In some variants, the trailer includes a depth sensor that can detect if the trailer is within a suitable depth of water for launching and/or retrieving a watersport boat. In some variants, the trailer includes a depth sensor that can detect when the sensor is in water, which can indicate that the trailer is in a suitable depth of water. An alert can be communicated to the user via speaker(s), light(s), display(s), an application on the user's mobile device (e.g., smartphone), a display screen of the tow vehicle, etc. to conveniently notify the user that the trailer is within a suitable depth. This can enable the user to consistently and efficiently position the trailer on a boat ramp without the risk of misjudgment of depth and/or reliance on third parties. In some variants, the trailer can include one or more sensors that can detect the positioning of the watersport boat relative to the trailer. A message and/or graphic can be displayed to the user indicative of the positioning of the watersport boat on the trailer to assist in placement.

In some variants, a trailer that can be used to tow a watersport vehicle is disclosed herein. The trailer can include a frame that can support a watersport vehicle. The trailer can include wheels that can moveably support the frame. The trailer can include a controller that can be operatively connected to a depth sensor. The depth sensor can detect if the trailer is within a predetermined depth of water to load the watersport vehicle onto the trailer. The controller can notify a user if the trailer is within the predetermined depth of water.

In some variants, the trailer can have a speaker. The controller can command the speaker to sound an alarm if the trailer is within the predetermined depth of water.

In some variants, the trailer can have a light source. The controller can command the light source to emit light if the trailer is within the predetermined depth of water.

In some variants, the trailer can have one or more guide poles. In some variants, the light source can be disposed on the guide poles.

In some variants, the depth sensor can detect if the depth sensor is within water to detect if the trailer is within a predetermined depth of water to load the watersport vehicle onto the trailer.

In some variants, the controller can be in communication with a portable electronic device. The controller can command the portable electronic device to provide a message to a user based on the detected depth of the trailer.

In some variants, the portable electronic device can display the message to the user via a display of the portable electronic device.

In some variants, the portable electronic device can audibly emit the message to the user via a speaker of the portable electronic device.

In some variants, the controller can be in communication with a display of a tow vehicle. In some variants, the controller can command the display of the tow device to provide a message to a user based on the detected depth of the trailer.

In some variants, the depth sensor can detect if the trailer is within a depth of water that is below the predetermined depth. The controller can notify the user if the trailer is within the depth of water that is below the predetermined depth.

In some variants, the controller can provide a message to the user recommending that the trailer be backed further down a boat ramp to a deeper depth.

In some variants, the depth sensor can detect if the trailer is within a depth of water that is above the predetermined depth. The controller can notify the user if the trailer is within the depth of water that is above the predetermined depth.

In some variants, the controller can provide a message to the user recommending that the trailer be pulled up a boat ramp to a shallower depth.

In some variants, the depth sensor can be disposed on the fender of the trailer.

In some variants, the depth sensor can be disposed on the fender backboard.

In some variants, the trailer can have one or more steps.

In some variants, the one or more steps can include soft grip or textured surfaces that can increase traction between the one or more steps and a foot of the user.

In some variants, the trailer can include one or more cameras that can capture visual data of a view to a rear of the trailer.

In some variants, the visual data captured by the camera can be communicated to a display of a tow vehicle.

In some variants, the visual data captured by the camera can be communicated to a display of a portable electronic device of a user.

In some variants, the trailer can have one or more proximity sensors that can detect if the trailer is within a predetermined distance of an object, person, and/or structure. The controller can communicate data from the proximity sensors to an avoidance system of a tow vehicle.

In some variants, the trailer can include one or more bunks that can catch a hull of the watersports vehicle and one or more bunk sensors that can detect if the hull of the watersports vehicle is centered on the trailer.

In some variants, the controller can provide a message to the user indicative of whether or not the watersport boat is centered on the trailer.

In some variants, a method of preparing a watersport boat for being towed on a trailer is disclosed herein. The method can include detecting via one or more sensors that the watersport boat is positioned on the trailer. The method can include determining via a boat controller that one or more tanks of a ballast system are holding water. The method can include notifying a user that the one or more tanks are holding water. The method can include emptying the one or more tanks of water in preparation for towing the watersport boat on a trailer.

In some variants, the method can include determining via the boat controller that a bilge plug of the ballast system is not removed. The method can include notifying the user that the bilge plug is not removed. The method can include removing the bilge plug.

In some variants, the method can include determining via the boat controller that a wedge is not stowed. The method can include notifying the user that the wedge is not stowed. The method can include stowing the wedge.

In some variants, the method can include determining via the boat controller that a wave/wakeshaper is not stowed. The method can include notifying the user that the wave/wakeshaper is not stowed. The method can include stowing the wave/wakeshaper.

In some variants, the method can include determining via the boat controller that a thruster is running. The method can include notifying the user that the thruster is running. The method can include turning off the thruster.

In some variants, the method can include determining via the boat controller that an engine is running. The method can include notifying the user that the engine is running. The method can include turning off the engine.

In some variants, the method can include determining via the boat controller that the power system of the watersport boat is active. The method can include notifying the user that the power system is active. The method can include deactivating the power system.

In some variants, a method of controlling a braking unit of a trailer configured to tow a watersport boat is disclosed herein. The method can include detecting that a trailer wiring harness of the trailer is operatively connected to a tow vehicle wiring harness of a tow vehicle. The method can include determining that a braking system of the tow vehicle is engaged. The method can include automatically releasing the braking unit of the trailer.

In some variants, the method can include providing a message and/or graphic to a user indicating that the braking unit of the trailer is released.

In some variants, a trailer that can tow a watersport boat is disclosed herein. The trailer can include a frame that can support a watersport boat. The trailer can include wheels that can moveably support the frame. The trailer can include one or more bunks that can catch a hull of the watersport boat. The trailer can include one or more bunk sensors disposed on the one or more bunks. The one or more bunk sensors can detect a hull of the watersport boat. The trailer can include a controller that can be operatively connected to the bunk sensors. The controller can notify a user of the positioning of the hull of the watersport boat with respect to the bunks.

In some variants, the controller can notify the user when the hull of the watersport boat is contacting all of the one or more bunks.

In some variants, a trailer that can be used to tow a watersport vehicle is disclosed herein. The trailer can include a frame that can support a watersport vehicle. The trailer can include a controller that can be operatively connected to a depth sensor. The depth sensor can detect water. The depth sensor can be disposed at a position on the trailer such that the detection of water by the depth sensor indicates that the trailer is within a suitable depth of water to load the watersport vehicle onto the trailer. The controller can notify a user if the trailer is within the suitable depth of water.

In some variants, the trailer can have a speaker. The controller can command the speaker to sound an alarm if the trailer is within the suitable depth of water.

In some variants, the trailer can have a light source. The controller can command the light source to emit light if the trailer is within the suitable depth of water.

In some variants, the trailer can have one or more guide poles, wherein the light source is disposed on the guide poles.

In some variants, the depth sensor can be a float switch.

In some variants, the depth sensor can be disposed at a position on the trailer that is 22-36 inches off a ground surface.

In some variants, the depth sensor can be disposed at a position on the trailer such that the top of the depth sensor is approximately 28 inches off a ground surface.

In some variants, the depth sensor can be disposed at a position on the trailer such that the top of the depth sensor is approximately 30 inches off a ground surface.

In some variants, a trailer that can be used to tow a watersport vehicle is disclosed herein. The trailer can include a frame that can support a watersport vehicle. The trailer can include a controller that can be operatively connected to a depth sensor. The depth sensor can detect whether the depth sensor is within a predetermined depth of water that is indicative that the trailer is within a suitable depth of water to load the watersport vehicle onto the trailer. The controller can notify a user if the trailer is within the suitable depth of water.

In some variants, the trailer can include a speaker. The controller can command the speaker to sound an alarm if the trailer is within the suitable depth of water.

In some variants, the trailer can include a light source. The controller can command the light source to emit light if the trailer is within the suitable depth of water.

In some variants, the trailer can include one or more guide poles. The light source can be disposed on the guide poles.

In some variants, the depth sensor can be a float switch.

In some variants, the depth sensor can be disposed at a position on the trailer that is 22-36 inches off a ground surface.

In some variants, the depth sensor can be disposed at a position on the trailer such that the top of the depth sensor is approximately 28 inches off a ground surface.

In some variants, the depth sensor can be disposed at a position on the trailer such that the top of the depth sensor is approximately 30 inches off a ground surface.

BRIEF DESCRIPTION OF THE DRAWINGS

Various embodiments are depicted in the accompanying drawings for illustrative purposes and may not be drawn to scale, and should in no way be interpreted as limiting the scope of the embodiments. In addition, various features of different disclosed embodiments can be combined to form additional embodiments, which are part of this disclosure.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Figure 1:
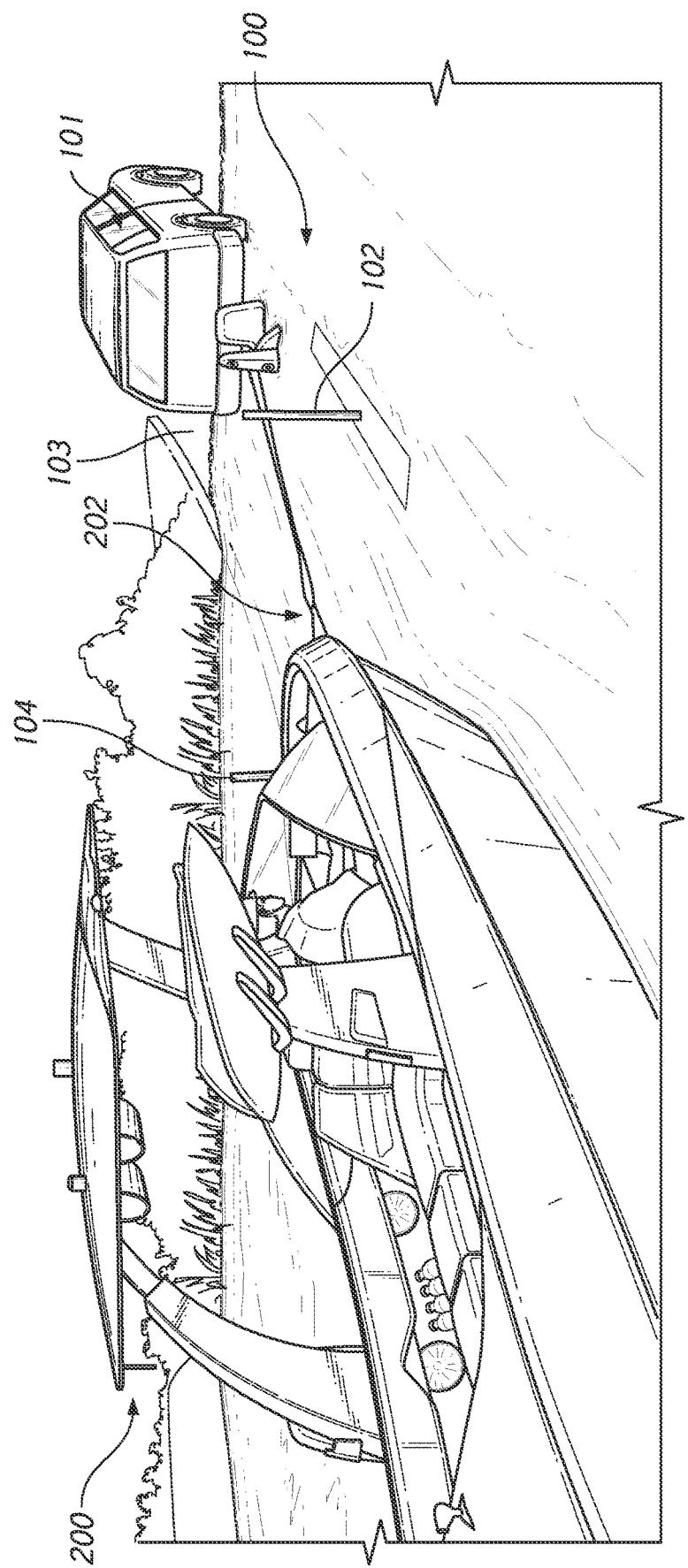
FIG. 1 illustrates a watersport boat in the process of being loaded onto a trailer.

FIG. 1 illustrates an example watersport boat (e.g., power boat, watercraft, boat, marine vehicle, aquatic vehicle, watersport vehicle) 200 being loaded onto a trailer 100 attached to a tow vehicle 101. The tow vehicle 101 and trailer 100 are positioned on a boat ramp 103 with the trailer 100 within a suitable depth of water to allow the watersport boat 200 to navigate thereon. The user, however, may have difficulty seeing the depth of the trailer 100 within the water from the driver's seat of the tow vehicle, resulting in the user repeatedly exiting the tow vehicle 101 to verify whether the trailer 100 is at a suitable depth and/or relying on a third party. If the trailer 100 is at an unsuitable depth, the watersport boat 200 may not be able to navigate onto the trailer 100 and/or the watersport boat 200 may be damaged by the frame of the trailer 100. If the trailer 100 is too deep in the water, the trailer 100 may not catch the bow 202 and/or hull of the watersport boat 200, which can result in the watersport boat 200 being damaged on the frame and/or other feature of the trailer 100 and/or damaging the tow vehicle 101.

The trailer 100 can include a starboard guide pole (post) 102 and a port guide pole (post) 104 to help the user to center the watersport boat 200 on the trailer 100. For example, the user can position the bow 202 of the watersport boat 200 between the starboard guide pole 102 and the port guide pole 104 as the watersport boat 200 is driven onto the trailer 100. Even with the starboard guide pole 102 and the port guide pole 104, it can be difficult for the user to know if the watersport boat 200 is properly centered on the trailer 100. For example, the keel of the watersport boat 200 can be disposed between bunks (described in more detail herein) for the watersport boat 200 to be properly centered, which can be difficult for the user to determine. In some instances, the user may pull the watersport boat 200 out of the water on the trailer 100 before being able to verify if the watersport boat 200 is properly centered, which can result in the user backing the trailer 100 with the watersport boat 200 back into the water for proper centering.

Figure 2A:
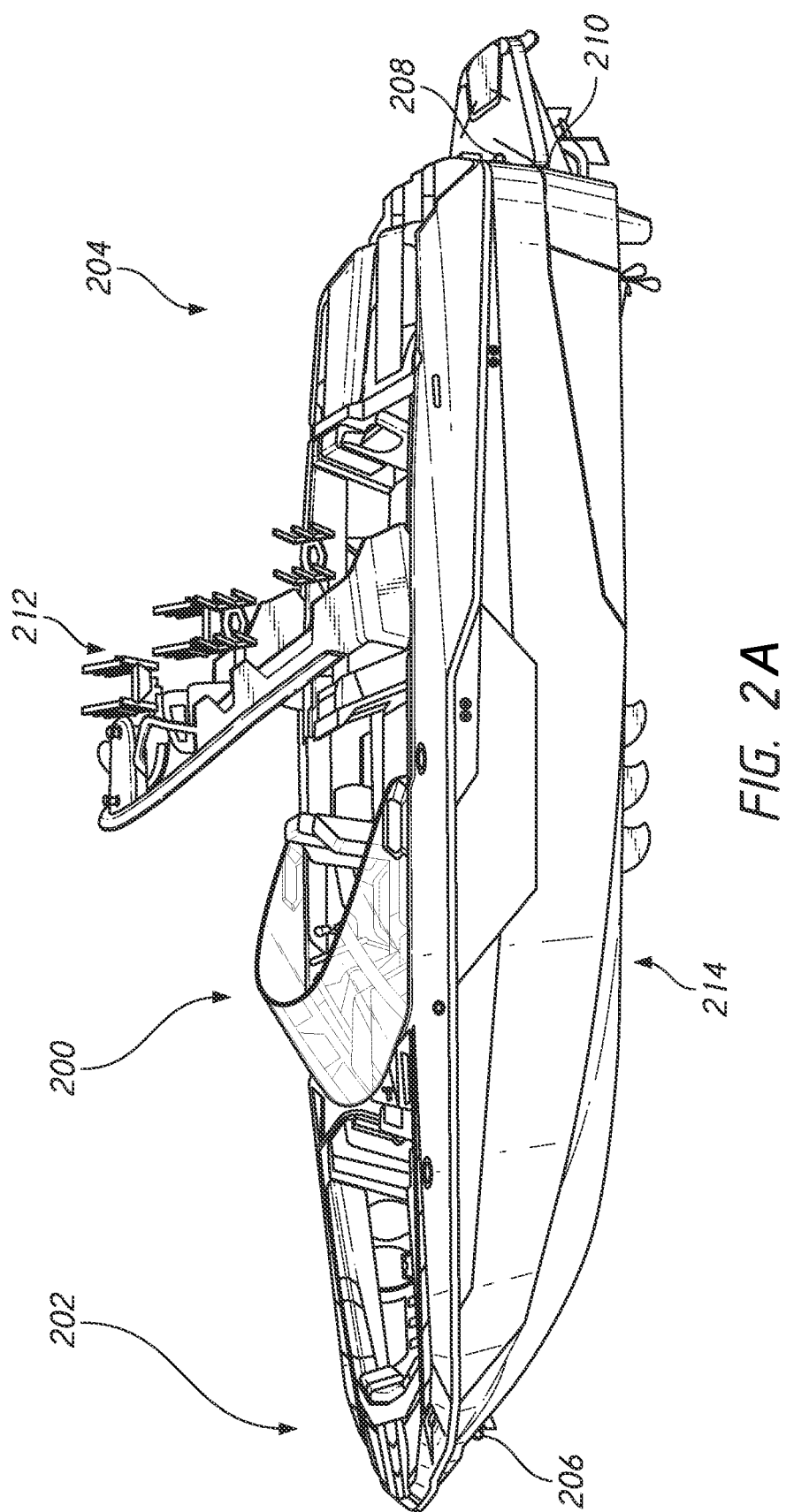
FIG. 2A illustrates an example watersport boat.
Figure 2B:
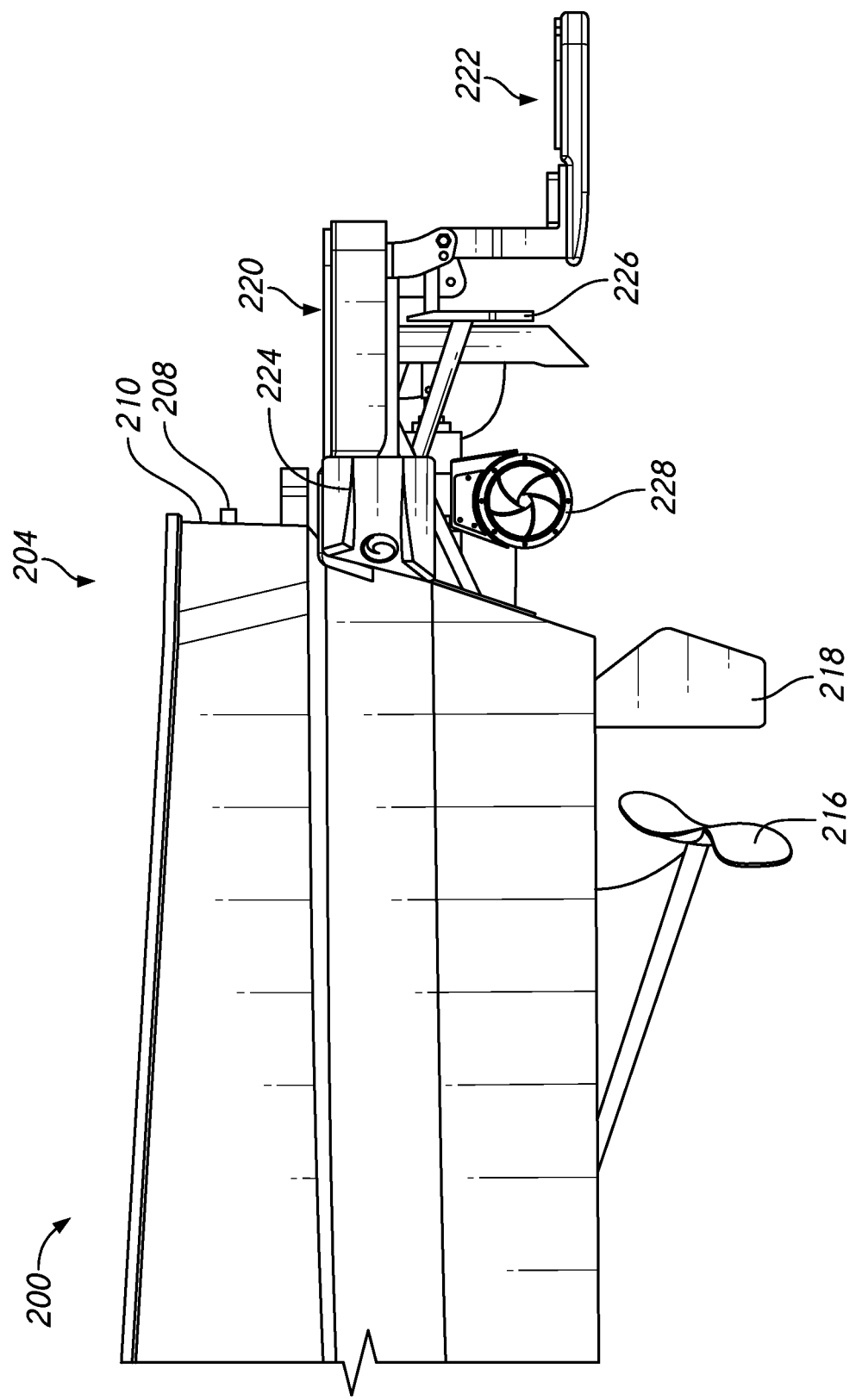
FIG. 2B illustrates a portion of an example watersport boat.
Figure 2C:
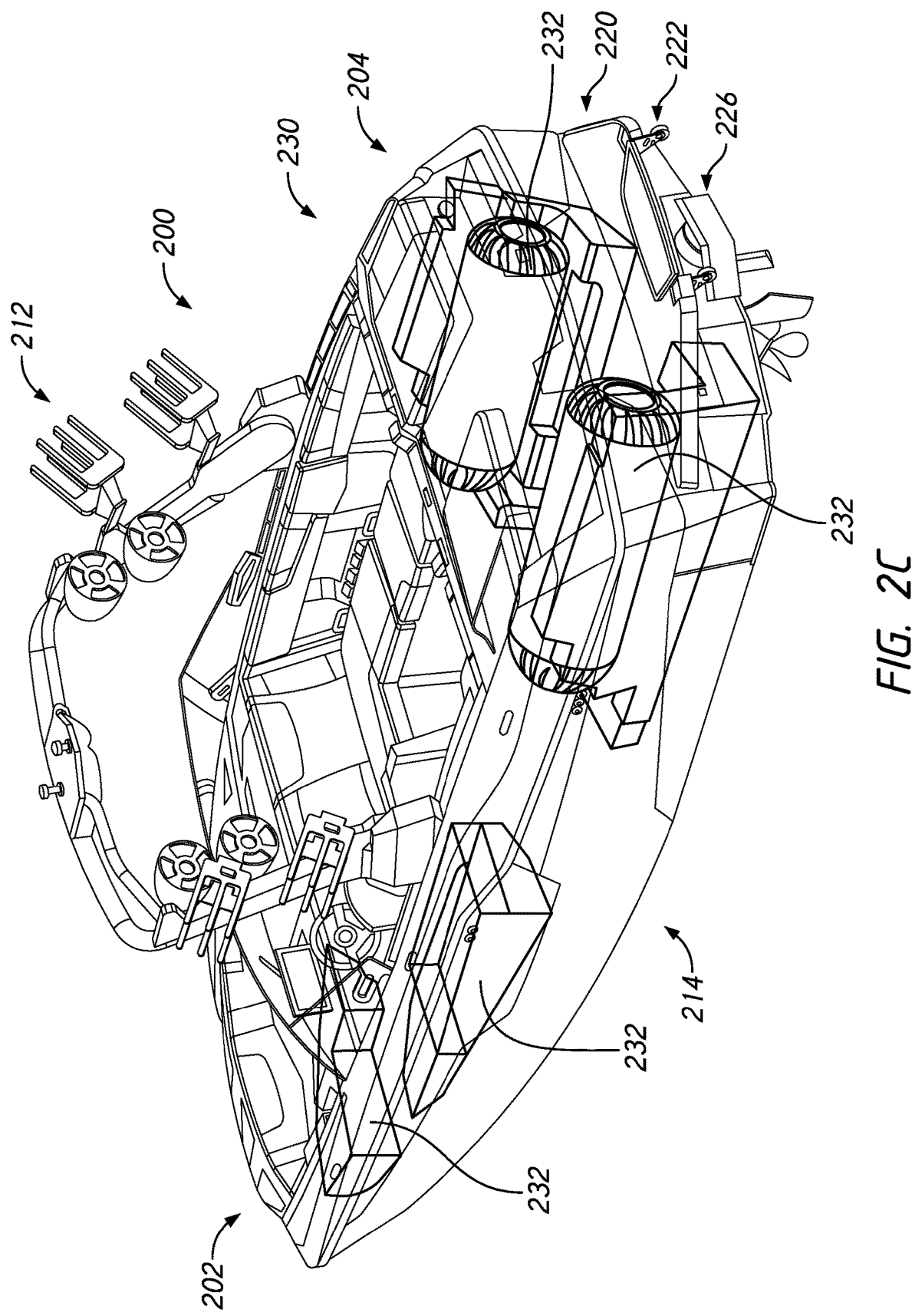
FIG. 2C illustrates an example ballast tank system.

FIG. 2A-2C illustrate an example watersport boat 200. As shown in FIG. 2A, the watersport boat 200 includes a bow 202 and a stern 204. The watersport boat 200 can include a bow eye 206 which can be used to winch the watersport boat 200 for towing, as described in more detail herein. The watersport boat 200 can include one or more transom hooks (transom loops, rings, eyes) 208. In some variants, a transom hook 208 can be disposed on the port side of the transom 210 and another transom hook 208 can be disposed on the starboard side of the transom 210. The transom hook(s) 208 can be coupled to transom straps to help secure the watersport boat 200 on the trailer 100. The watersport boat 200 includes a hull 214. The bottom-most longitudinal structure of the hull 214 being the keel. The watersport boat 200 can include a tower 212 which can include light(s), camera(s), watersport equipment holders, speaker(s), and/or other features.

As shown in FIG. 2B, the watersport boat 200 can include a variety of features to facilitate watersports. The watersport boat 200 can include a propeller (i.e., prop) 216 that can be powered by an engine to propel the watersport boat 200. The watersport boat 200 can include a rudder 218 that can steer the watersport boat 200. The watersport boat 200 can include a swim deck 220. The swim deck 220 can aid users in ingressing into the watersport boat 200 from the water and egressing from the watersport boat 200 to the water. The top surface of the swim deck 220 can be proximate (at, above, or below) the waterline to aid ingress and egress. The watersport boat 200 can include a rotatable platform 222 that can aid users in mounting and/or dismounting the swim deck 220. The rotatable platform 222 can be rotated to a stowed position, which can be within the swim deck 220, and deployed, as illustrated, to aid users.

The water-sports boat 200 can include one or more wake/wave shaper(s) (water diverter(s), flap(s), tab(s)) 224 that can be mounted, which can include adjustably mounted, to the water-sports boat 200 for deflecting water travelling past the transom 210 of the water-sports boat 200 to shape a wake for surfing. One or more wake/wave shaper(s) 224 can be positioned on the portside and/or stern 204 of the watersport boat 200. One or more wakE/wave shaper 224 can be positioned on the starboard side and/or stern 204 of the watersport boat 200. In some variants, the wake/wave shaper(s) 224 can be stowed in recess(es) of the swim deck 220. One such device is commercially available from Malibu Boats under the product name "SURF GATE®," which is similar to those flaps described in U.S. Pat. No. 9,260,161, the entire content of which is incorporated herein. Other commercially available surf shapers include tabs or blades manually operated, electronically controlled, suction or bolt-on adherent devices, and the like.

The water-sports boat 200 can include a wake-modifying device(s) (wedge(s)) 226 to enhance the overall size of the wake formed by the watersport boat 200. The wedge 226 can be stowed, as illustrated, or deployed to modify the wake created by the hull 214 of the watersport boat 200. For example, the wedge 226 can be rotated downward to a deployed position within the water to create a downward force, pulling the hull 214 deeper into the water to create a larger wake. One such device is commercially available from Malibu Boats under the product name, "Power Wedge," which is similar to that described in U.S. Pat. No. 7,140,318, the entire content of which is incorporated herein for all purposes by this reference. Another such device may incorporate pivotal centerline fins of the type developed by Malibu Boats and described in U.S. Pat. No. 8,534,214, the entire content of which is also incorporated herein for all purposes by this reference.

The wake/wave shaper(s) 224 and wedge(s) 226 can modify the configuration of a wake, such as the shape and/or size. The wake/wave shaper(s) 224 and/or wedge(s) 226 can be used with a ballast tank system, described in more detail herein, to produce wakes of a greater size.

In some variants, the water-sports boat 200 can include a thruster 228. The thruster 228 can be used to rotate/pivot the stern 204 of the watersport boat 200, which can be useful when docking, loading onto the trailer 100, and/or picking up a fallen user from the water. The thruster 228 can include an electric motor which can be water cooled to allow for increased continuous use. The thruster 228 can be integrated into the transom 210. The thruster 228 can operate independent from the steering wheel of the watersport boat 200. The thruster 228 can be integrated with the wedge(s) 226. The thruster 228 can be positioned out of the water when the watersport boat 200 is on plane. One such device is commercially available from Malibu Boats under the product name "Stern Turn." In some variants, the thruster 228 may pivot to provide thrust in more directions than starboard or port, such as thrust in up to 360 degrees. In some variants, more than one thruster 228 can be disposed on the watersport boat 200. In some variants, a thruster 228 can be disposed proximate the bow 202 of the water-sports boat 200.

FIG. 2C illustrates an example ballast tank system of the watersport boat 200. The ballast tank system can include one or more tanks 232 of varying sizes and locations that can fill and empty to selectively increase the weight of the watersport boat 200 to produce wakes of greater size and/or different configurations that are suitable for wake boarding, wake surfing, pulling inflatables, or the like. The ballast tank system can pump water from a body of water on which the watersport boat 200 is floating into the one or more tanks 232 to weigh down the watersport boat 200. The one or more tanks 232 can be emptied back into the body of water before towing the watersport boat 200 to another location.

Figure 3A:
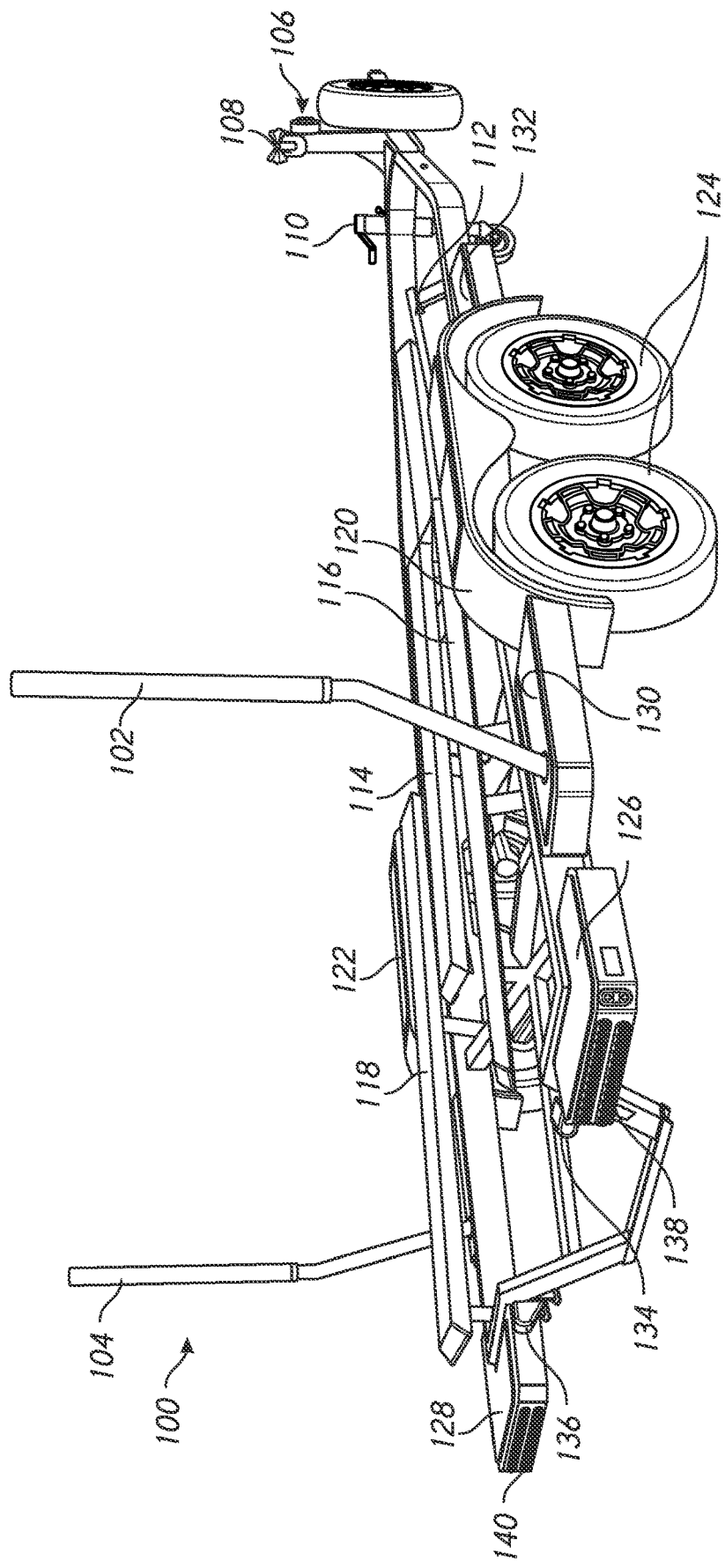
FIG. 3A illustrates an example two-axle trailer.
Figure 3B:
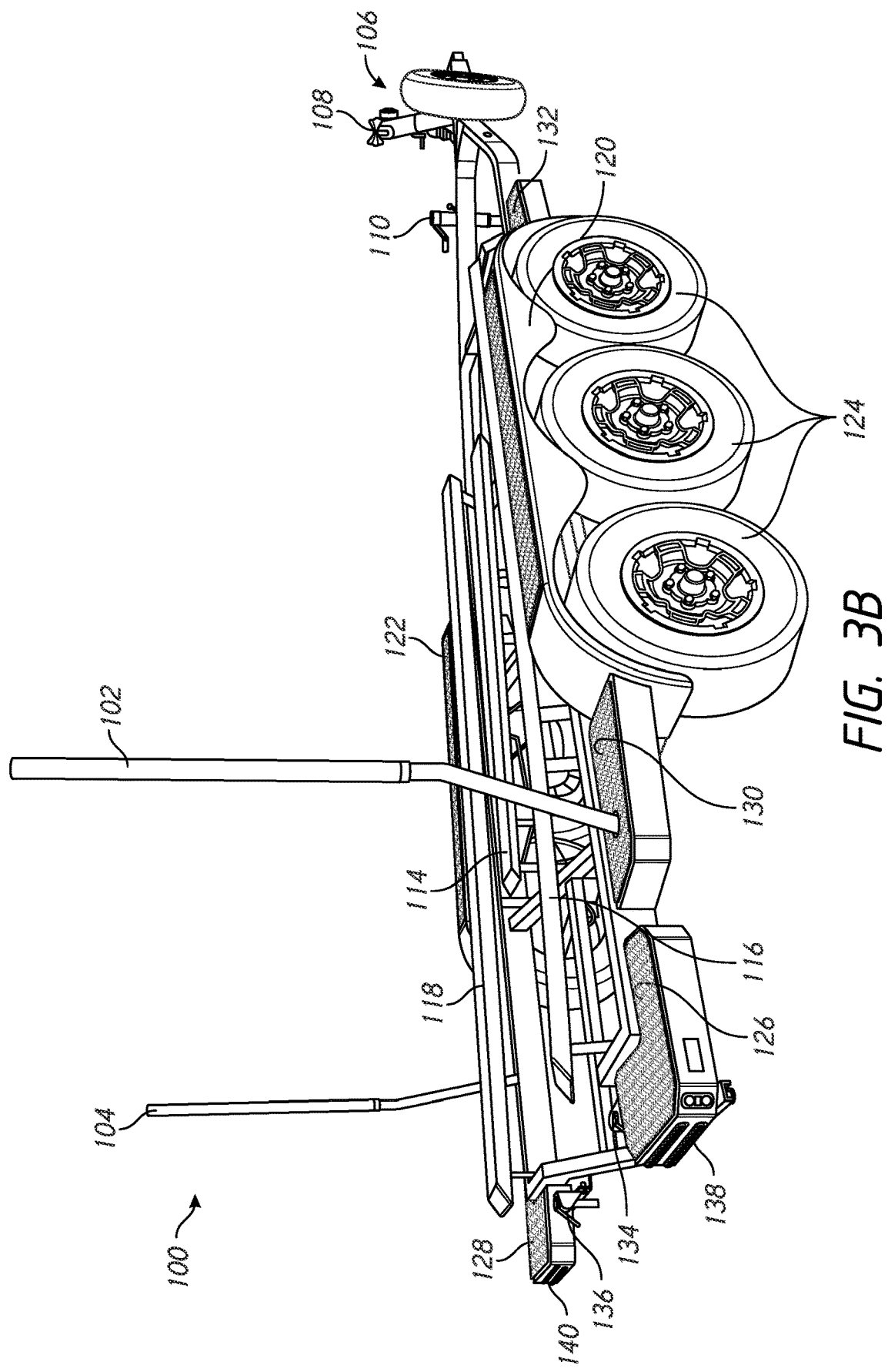
FIG. 3B illustrates an example three-axle trailer.

FIGS. 3A and 3B illustrate an example trailer 100 for towing a watersport boat 200, such as shown in FIGS. 2A-2C. As described above, the trailer 100 can include the starboard guide pole 102 and port guide pole 104 that can help the user center the watersport boat 200.

The trailer 100 can include a plurality of bunks to catch the hull 214 of the watersport boat 200 as the watersport boat 200 is navigated onto trailer 100. The plurality of bunks can support the watersport boat 200 on the trailer 100 during towing. The plurality of bunks can be made of wood(s), metal(s), metal alloy(s), and/or polymer(s). The plurality of bunks can include a covering and/or coating of carpet(s), wood(s), and/or polymer(s) to help prevent the bunks from damaging the hull 214 of the watersport boat 200. The plurality of bunks can include a rear starboard side bunk 116, rear port side bunk 118, front starboard side bunk 112, and/or front port side bunk 114. The rear starboard side bunk 116 and rear port side bunk 118 can be positioned on the outside of the front starboard side bunk 112 and front port side bunk 114. The rear starboard side bunk 116 and rear port side bunk 118 can support the more aft portion of the watersport boat 200. The front starboard side bunk 112 and front port side bunk 114 can support the more forward portion of the watersport boat 200. When the trailer 100 is within a suitable depth of water, the rear starboard side bunk 116, rear port side bunk 118, front starboard side bunk 112, and/or front port side bunk 114 can catch the hull 214 of the watersport boat 200 to prevent forward movement, which can indicate to the user that the watersport boat 200 is ready to be winched into place on the trailer 100. In some variants, the trailer 100 can include one or more rollers that can function similarly to the bunks but with the added characteristic of rolling.

The trailer 100 can include a brake (emergency brake) unit(s) 110. The brake unit(s) 110 can be selectively engaged to prevent and/or resist movement of the trailer 100 (i.e., lock one or more wheels 124 of the trailer 100) and/or a jack unit, described herein. In some variants, the brake unit(s) 110 can be hand operated. In some variants, the trailer 100 includes more than one brake unit(s) 110 (e.g., two, three, four, etc.).

The trailer 100 can include one or more steps which can enable the user to conveniently ingress into and egress from the watersport boat 200 when loaded on the trailer 100. The trailer 100 can include a rear starboard step (transom starboard step) 126, rear port step (transom port step) 128, starboard step 130, port step, front starboard step (bow starboard step) 132, and/or front port step (bow port step). The rear starboard step 126, rear port step 128, starboard step 130, port step, front starboard step 132, and/or front port step can include soft grip, which can be durable and/or shock absorbent, to improve traction. In some variants, the rear starboard step 126, rear port step 128, starboard step 130, port step, front starboard step 132, and/or front port step can include a texture such as plated stainless steel diamond plate to improve traction, as illustrated in FIG. 3B.

The trailer 100 can include light(s) 138, 140. The light(s) 138, 140 can provide alert(s), which can include indicating that the tow vehicle 101 is braking, turning, reversing, etc. The light(s) 138, 140, in some variants, can emit different colors and/or different flashing patterns to provide varying alerts to the user and/or observer.

The trailer 100 can include transom strap unit(s) 134, 136. The transom strap unit(s) 134, 136 can include retractable transom straps that can be deployed to couple via a fastener to the transom hook(s) 208. In some variants, the transom strap unit(s) 134, 136 can tighten the transom straps when coupled to the transom hook(s) 208 to help secure the watersport boat 200 to the trailer 100.

The trailer 100 can include fenders to cover wheels 124. The trailer 100 can include a starboard side fender 120 and port side fender 122. The starboard side fender 120 and port side fender 122 can include soft grip, textured surfaces, and/or other attributes to provide traction, durability, and/or shock absorbance to enable the user to conveniently mount the fenders 120, 122. The starboard side fender 120 and port side fender 122 can each cover one or more wheels 124 (e.g., one, two, three, four, or more wheels). For example, as illustrated in FIG. 3A, the starboard side fender 120 and port side fender 122 can each cover two wheels 124 for a two-axle trailer 100. As illustrated in FIG. 3B, the starboard side fender 120 and port side fender 122 can each cover three wheels 124 for a three-axle trailer 100.

Figure 3C:
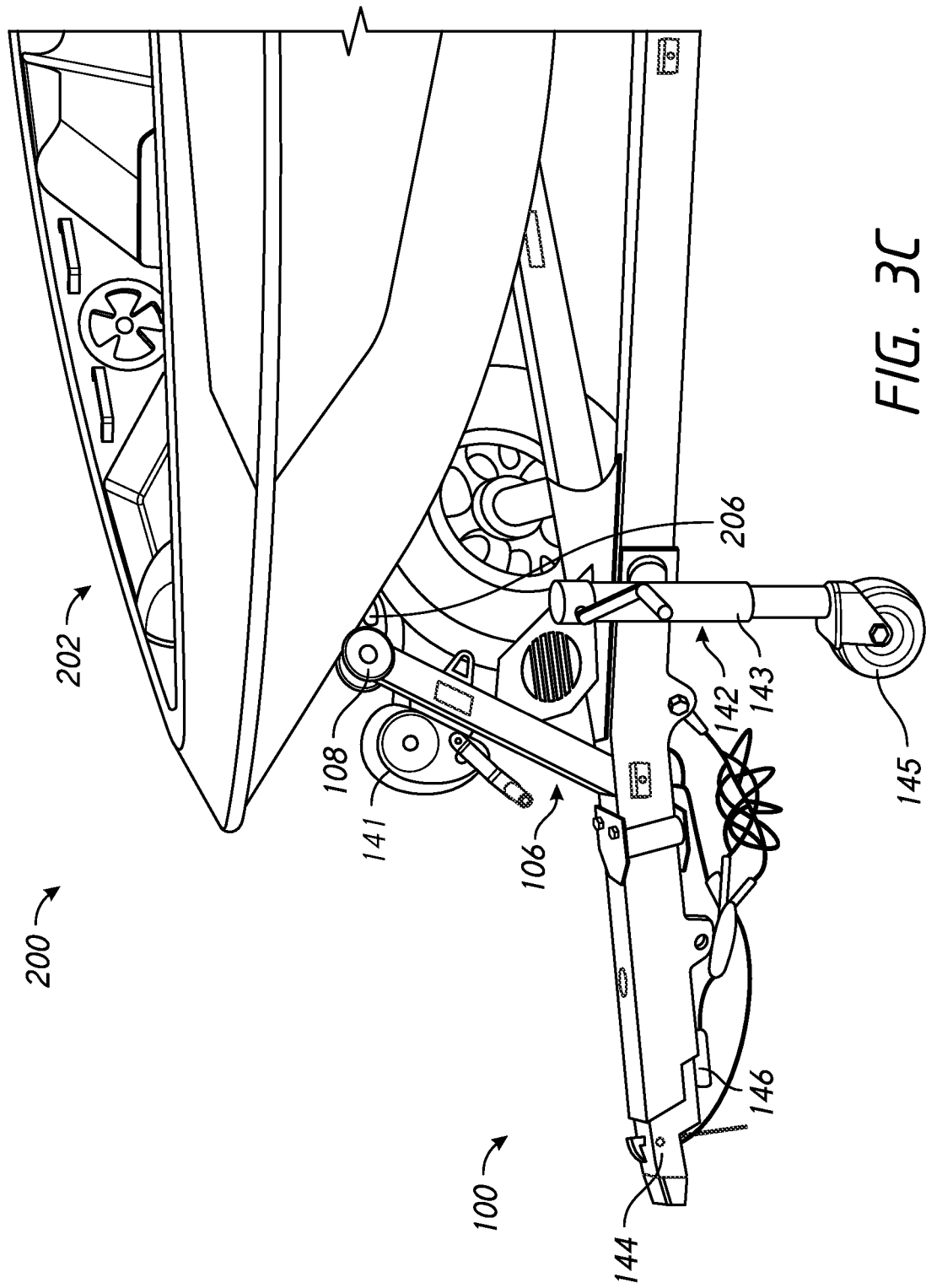
FIG. 3C shows a front portion of an example trailer with a watersport boat.

The trailer 100 can include a bow stand 106. The bow stand 106 can include a bow stop 108 which can interface with the bow 202 of the watersport boat 200, as shown in FIG. 3C, to secure the bow 202 in place. The bow stand 106 can include a winch unit 141. The winch unit 141 can include a cable, strap, rope, chain, or the like that can couple to the bow eye 206 with a fastener. The winch unit 141 can reel in the cable to pull the bow 202 securely against the bow stop 108. In some variants, the winch unit 141 can be cranked by hand to reel in the cable. When loading the boat 200, the user can center the boat 200 on the trailer 100 and cease propelling the boat 200 forward via the engine. The user can couple the cable of the winch unit 141 to the bow eye 206 and reel in the cable of the winch unit 141 to position the bow 202 against the bow stop 108 and/or pull the watersport boat 200 securely onto the bunks of the trailer 100.

The trailer 100 can include a jack unit 142. The jack unit 142 can include a wheeled footing 145 or a stand. The jack unit 142 can be used to support the front of the trailer 100 when not hitched to the tow vehicle 101. The jack unit 142 can extend or retract support member (shaft, support, rod) 143 to raise or lower the front portion of the trailer 100. In some variants, a wheeled jack unit 142 can include a brake to prevent the rolling of the wheel such that the trailer 100 can be secured in position. In some variants, the jack unit 142 can be cranked by hand to raise or lower the front portion of the trailer 100.

The trailer 100 can include a tongue 144, which may be referred to as an actuator. The tongue 144 can couple with a trailer hitch ball of the tow vehicle 101. When the jack unit 142 is not deployed to support the trailer 100, the tongue 144 can support the front portion of the trailer 100 on the trailer hitch ball of the tow vehicle 101.

The trailer 100 can include a trailer wiring harness 146. The trailer wiring harness 146 can operatively connect to a wiring harness of the tow vehicle 101. The battery of the tow vehicle 101 can provide the power to operate electronic features of the trailer 100 via the trailer wiring harness 146 and tow vehicle wiring harness 105. Braking and/or turn signals can be relayed from the tow vehicle 101 to the light(s) of the trailer 100 via the trailer wiring harness 146 and tow vehicle wiring harness 105.

Figure 4A:
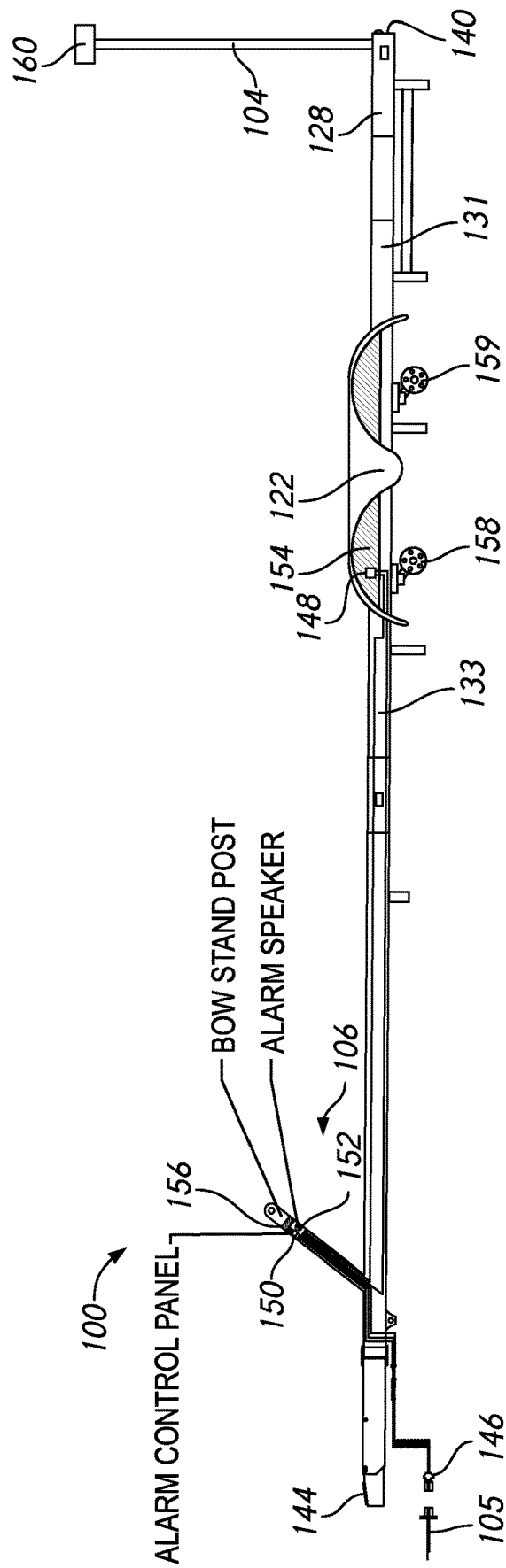
FIG. 4A schematically illustrates an example trailer with a depth sensor.

FIG. 4A illustrates the trailer 100 with a depth sensor 148 that can detect when the trailer 100 is within a suitable depth of water such that the watersport boat 200 can be unloaded from the trailer 100 into the water and/or loaded onto the trailer 100 from the water. The depth sensor 148 can improve the user's experience in unloading and/or loading the watersport boat 200 onto the trailer 100. The depth sensor 148 can automatically detect when the trailer 100 is at a suitable depth to load and/or unload the watersport boat 200, which can enable the user to more quickly and/or properly position the trailer 100 in water. The depth sensor 148 can enable the user to quickly and conveniently submerge the trailer 100 to an appropriate depth without the assistance of an onlooker and/or without frequently exiting the tow vehicle 101 to verify the depth of the trailer 100.

In some variants, the depth sensor 148 can detect when the trailer 100 reaches suitable depth for launching and/or retrieving the watersport boat 200. In some variants, the depth sensor 148 can detect when the depth sensor 148 contacts and/or is submerged in water to indicate that the trailer 100 is at a suitable depth for launching and/or retrieving the watersport boat 200 because the depth sensor 148 is positioned at a height on the trailer that corresponds to a water depth that is suitable for launching and/or retrieving the watersports boat 200. In some variants, the depth sensor 148 can detect the depth of the depth sensor 148 in the water (e.g., the depth below the surface of the water). In some variants, the depth sensor 148 can detect when the depth sensor 148 reaches a predetermined depth or is within a range of predetermined depths. In some variants, the depth sensor 148 can detect when the trailer 100 reaches a depth within a range of predetermined depths. In some variants, the depth sensor 148 can include one or more field effect detector cells that produce micro-electrical field(s) that detect disruptions caused by water or other fluids which can enable the detector cell(s) to be sealed to not contact water while detecting depth and/or submersion in water. Such a depth sensor can include a high water detection alarm manufactured by Johnson Pump (kit part number: 72303-003). In some variants, the depth sensor 148 can include a pressure level sensor(s), capacitance level sensor(s), float switch(es), magnetic float switch(es), conductive sensor(s), and/or other suitable sensors that can be used to detect the depth of the depth sensor 148 within the water and/or that the depth sensor 148 is submerged or contacting water, which can be indicative of the depth of the trailer 100 within water. In some variants, the depth sensor 148 can detect when water contacts the depth sensor 148, which can result in the emission of an alarm as described herein.

Figure 4B:
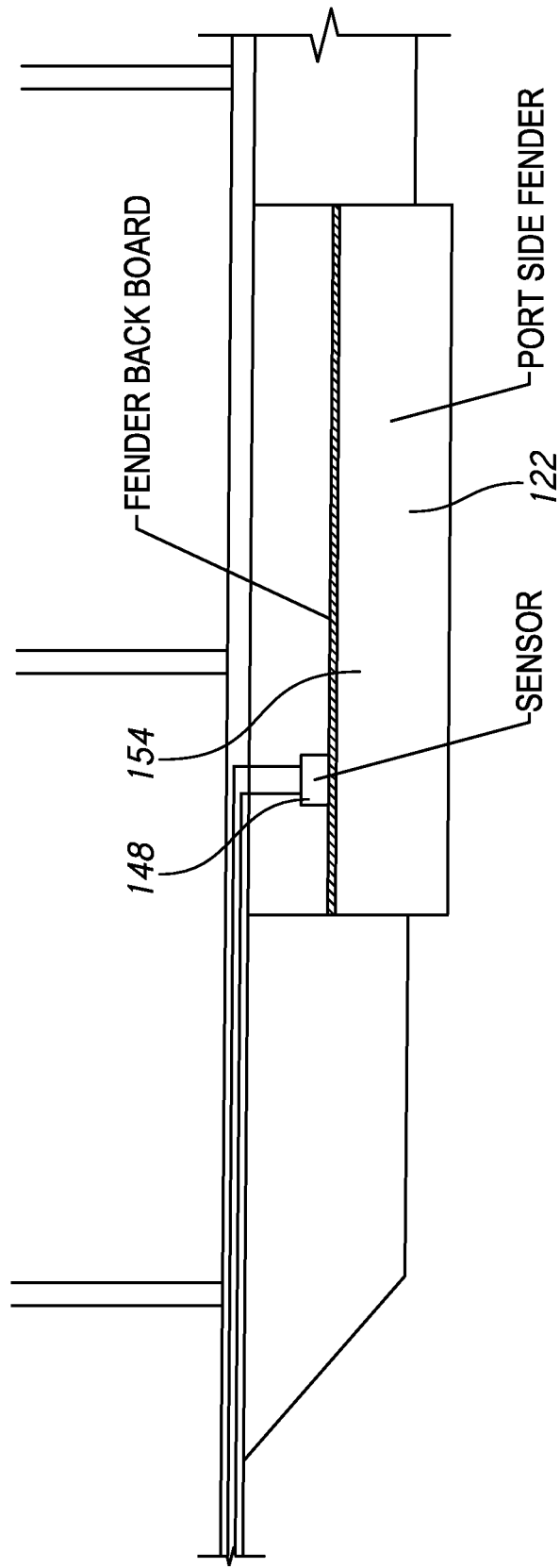
FIG. 4B schematically illustrates an enlarged view of the depth sensor positioned on the trailer.

The depth sensor 148 can be positioned at various positions on the trailer 100. The depth sensor 148 can be disposed on at least one of the fenders 122, 120 of the trailer 100. In some variants, the depth sensor 148 can be disposed on the fender back board 154, as illustrated in FIG. 4B. The fender 122, which can include the fender back board 154, can protect the depth sensor 148 from damage from the watersport boat 200 and/or other objects. In some variants, the fender 122 can be disposed forward of the port step 131 and/or rear port step 128. In some variants, the fender 122 can be disposed behind the front port step 133. In some variants, multiple depth sensors 148 can be positioned at various positions on the trailer 100. In some variants, a depth sensor 148 can be disposed on a starboard portion of the trailer 100 and another depth sensor 148 can be disposed on a port portion of the trailer 100, which can help detect the respective depths of the starboard and port portions of the trailer 100 within water (e.g., whether the depth sensor 148 is disposed on the port or starboard portions is within water, at a suitable depth within the water, and/or within a range of suitable depths).

The positioning of the depth sensor 148 on the trailer 100 can determine the detected depth that indicates the trailer 100 is at a suitable depth. For example, if the depth sensor 148 were positioned more forward, the depth sensor 148 may detect that the trailer 100 is at a suitable depth when the rear of the trailer 100 is at a relatively deeper position in the water. That is, because the trailer is entering the water often on a declining ramp, if the sensor 148 is more forward on the trailer, it will come in contact with the water when the rear of the trailer is further down the ramp, or in deeper water. Alternatively, when the depth sensor 148 is positioned more rearward, the depth sensor 148 may detect that the trailer 100 is at a suitable depth when at a relatively shallower position in the water as the sensor 148 comes into contact with the water earlier. The suitable depth detected by the depth sensor 148 can be based, at least in part, on the positioning of the depth sensor 148 on the trailer 100. For example, the depth sensor 148 may be positioned on a lower position on the trailer 100 such that the depth sensor 148 can be submerged to a deeper depth below the surface of the water before detecting that the depth sensor 148 is at a suitable depth, which can indicate that the trailer 100 is at a suitable depth. In some variants, the depth sensor 148 can be disposed at a position on the trailer 100 that is approximately 28 inches from a ground surface to a top of the depth sensor 148 when the trailer 100 has 14 inch tires and is loaded with the watersport boat 200. In some variants, the depth sensor 148 can be disposed at a position on the trailer 100 that is approximately 30 inches from a ground surface to a top of the depth sensor 148 when the trailer 100 has 18 inch tires and is loaded with the watersports boat 200. In some variants, the depth sensor 148 is disposed at a position on the trailer such that the top of the depth sensor 148 is approximately 22-36 inches off the ground surface when the trailer 100 is loaded with the watersport boat 200. In some variants, the depth sensor 148 is disposed at a position on the trailer such that the top of the depth sensor 148 is approximately 20-42 or more inches off the ground surface when the trailer is loaded with the watersport boat 200. In some variants, the size of the wheels 124 can influence where the depth sensor 148 is disposed and/or the detected depth that indicates the trailer 100 is at a suitable depth. As described herein, in some variants, the depth sensor 148 detects when the depth sensor 148 is submerged in and/or contacts water. The depth sensor 148 can trigger an alarm when submerged in and/or contacting water. Accordingly, the positioning of the depth sensor 148 on the trailer 100 can impact the depth to which the trailer 100 is submerged in water before the depth sensor 148 triggers an alarm.

In some variants, the positioning of the depth sensor 148 proximate one of the axles 158, 159 can enable the depth sensor 148 to accurately determine that the trailer 100 is at a suitable depth when positioned on boat ramps 103 of varying inclination grades. This can be at least partially attributed to the fact that the axles 158, 159 can act as a fulcrum (i.e., pivot point) of the trailer 100 as the trailer 100 is backed down an inclined boat ramp 103. The end portions (e.g., front and/or rear) of the trailer 100 may be pivoted closer or farther away from the boat ramp 103 to varying depths within the water but the portions of the trailer 100 proximate and/or at the axles 158, 159 may be substantially consistently spaced away from the surface of the boat ramp 103 as the trailer 100 is backed into the water, which can more accurately indicate the depth of the trailer 100 in the water. In some variants, the depth sensor 148 can be disposed on a middle portion of the trailer 100. In some variants, the depth sensor 148 can be disposed approximately 13 feet from the front of the tongue 144 (e.g., actuator) of the trailer 100 to the front side of the depth sensor 148. In some variants, the depth sensor 148 can be disposed approximately 17 feet and 6 inches from the front of the tongue 144 (e.g., actuator) of the trailer 100 to the front side of the depth sensor 148. In some variants, the depth sensor 148 can be disposed approximately 12 to 20 feet or more from the front of the tongue 144 (e.g., actuator) of the trailer 100 to the front side of the depth sensor 148.

In some variants, more than one depth sensor 148 can be located at various positions on the trailer 100 to detect depth at multiple locations. In some variants, the depth sensor 148 may consider the angle of the trailer 100 when detecting a suitable depth, which can be influenced by the angle of inclination of the boat ramp. Boat ramps 103 can have varying inclination angles, which can at least include 5 degrees up to at least 14 degrees.

Figure 4C:
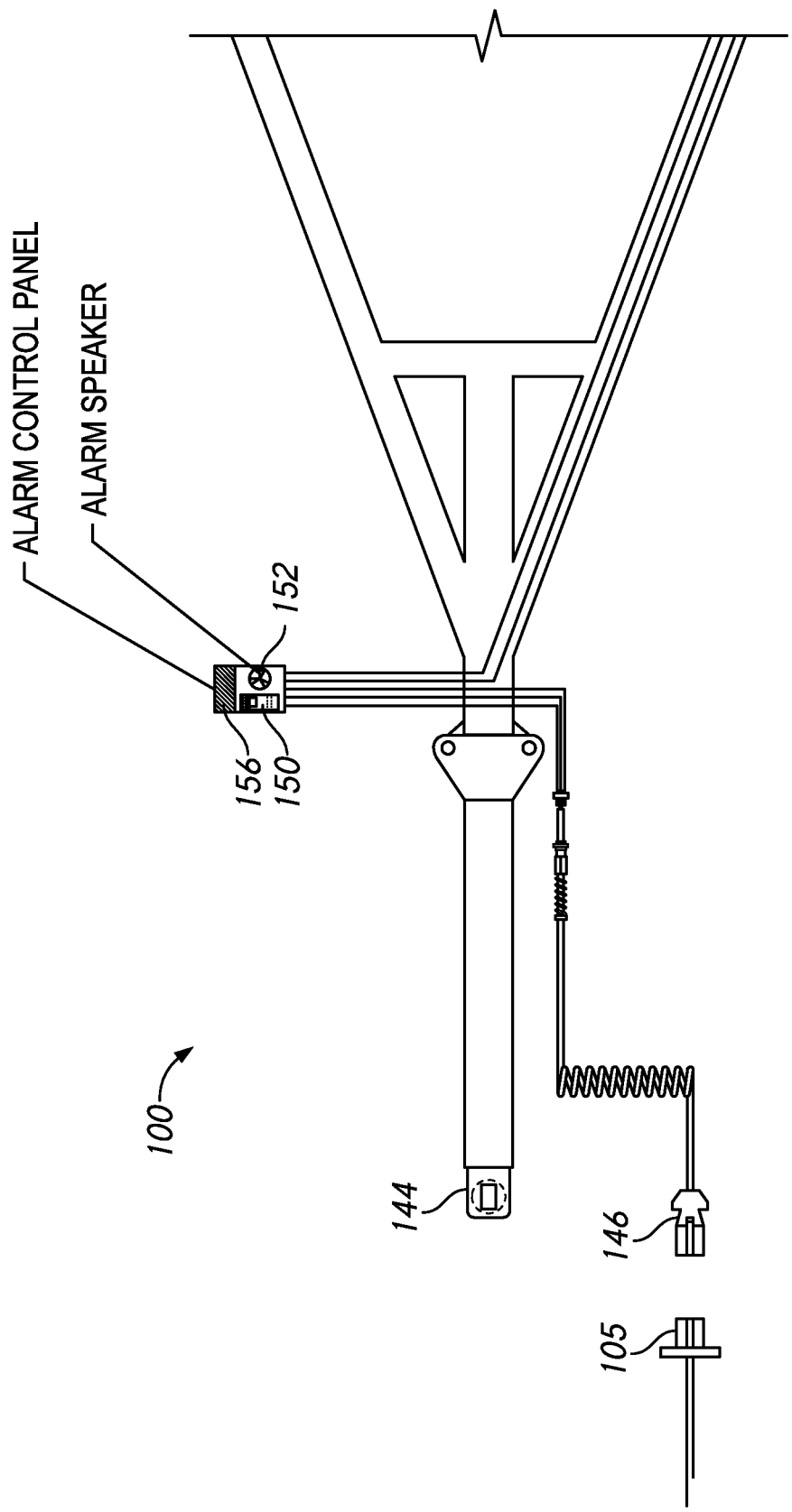
FIG. 4C schematically illustrates an enlarged view of a portion of the wiring for a control panel associated with the depth sensor.
Figure 4D:
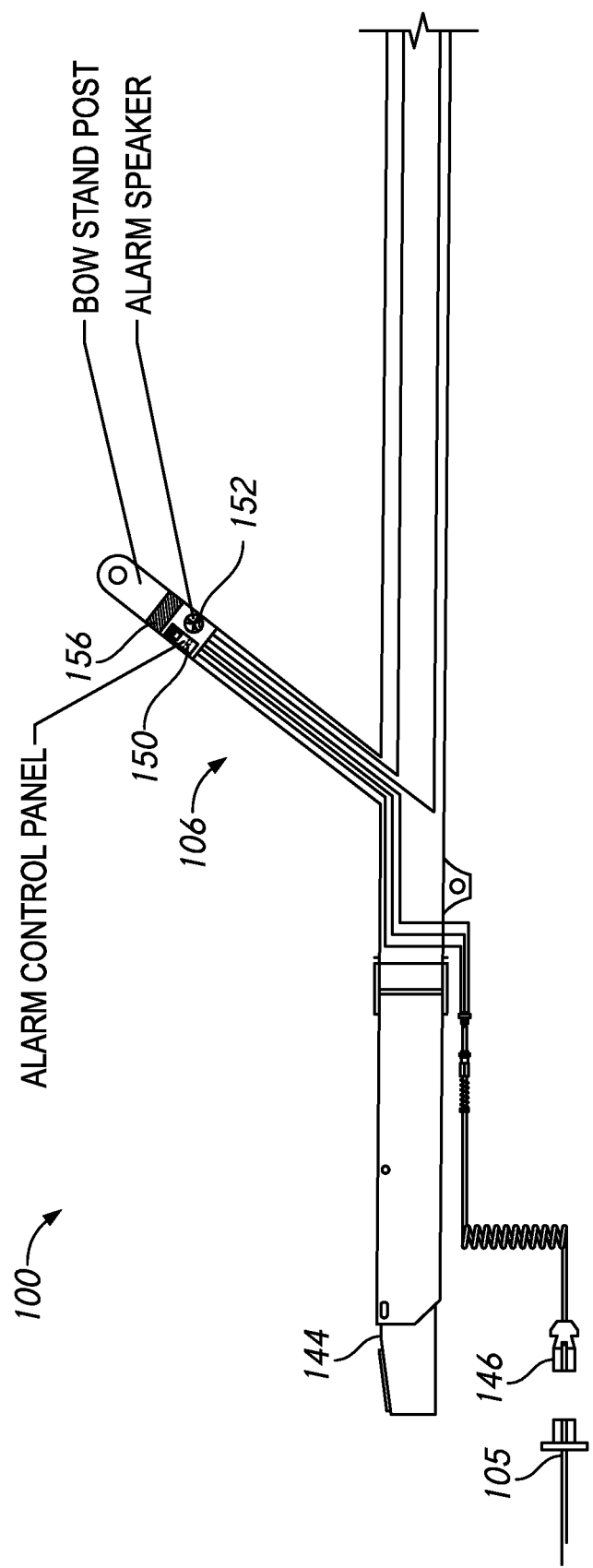
FIG. 4D schematically illustrates an enlarged view of a front portion of the trailer.

The trailer 100 can include a control panel 150 which can be operatively connected (e.g., wired connection, wireless connection) to the depth sensor 148, as shown in FIGS. 4C and 4D. The control panel 150 can include a controller, memory device having instructions stored thereon, transceiver, processor, and/or other features to perform the methods described herein. The control panel 150 can be disposed on the bow stand 106 or at other locations on the watersport boat 200. The control panel 150 can be water resistant or water proof. Positioning the control panel 150 on the bow stand 106 can conveniently position the control panel 150 at a higher elevation for the user to access. The control panel 150 can be manufactured by Johnson Pump (kit part number: 72303-003) as the control panel for the high water detection alarm.

The control panel 150 can include one or more speakers 152 that can emit audio data (e.g., sounds) and/or lights to emit visual information. In some variants, the speakers 152 are separate from the control panel 150. The depth sensor 148 can detect that the trailer 100 is within a suitable depth of water and/or submerged in or contacting water and send a signal to the control panel 150 and/or trailer controller 168 (described in more detail herein) which can command the speaker 152 to emit audio data (e.g., sounds, alarms) to indicate to the user that the trailer 100 is within a suitable depth of water. The speaker(s) 152 can be water proof or resistant. In some embodiments, the speaker(s) 152 can emit audio data under water that can be heard by the user above water. In some embodiments, the speaker(s) 152 can be disposed at a position, such as on the bow stand 106, that is unlikely to be submerged under water during normal use. As described herein, other alerts can be sent to the display(s), speaker(s), and/or light(s) of the trailer 100, tow vehicle 101, watersport boat 200, and/or portable device of the user (e.g., smart phone) to indicate that the trailer 100 is within a suitable depth of water.

In some variants, the visual information can include a flashing light or lights, light activation, activation of colors or the like. For example, the light or lights could flash faster or slower as the trailer approaches the proper depth. The light or lights could change from green to yellow to red, or vice versa as the trailer approaches the proper depth. The light or lights could act alone or in concert with the sound from the speakers.

In some variants, the control panel 150 can include a user interface to enable the user to control aspects of the depth sensor(s) 148. For example, the user interface may include a switch, button, or other mechanism to enable the user to arm the depth sensor(s) 148, turn off the depth sensor(s) 148, and/or test the speaker 152.

In some variants, the trailer 100 can include one or more light sources. The control panel 150 and/or trailer controller 168 can be operatively connected to one or more light sources 160. The light source 160 can be disposed on the starboard guide pole 102, port guide pole 104, and/or other positions on the trailer 100. In some variants, one or more light sources 160 can be disposed on each of the starboard guide pole 102 and port guide pole 104. In some variants, the control panel 150 and/or trailer controller 168 can send a signal to the light source(s) 160 to emit light to indicate to the user that the trailer 100 is at a suitable depth as detected by the depth sensor 148. In some variants, the light source(s) 160 can emit flashing patterns, pulses, etc. In some variants, the light source(s) 160 can emit light of different colors. In some variants, the light source(s) 160 can be positioned proximate a top of the starboard guide pole 102 and/or port guide pole 104.

In some variants, the trailer 100 can include one or more cameras 156. The one or more cameras 156 can be disposed on vary positions on the trailer 100. As described herein, the user can see a display of the view captured by one or more cameras 156 via a display of the tow vehicle 101, a portable device (e.g., a smart phone), and/or a display of the watersport boat 200. In some variants, a camera 156 can be disposed on the bow stand 106, which can capture a view of the trailer 100 and the watersport boat 200 during retrieval and launching. The camera 156 positioned on the bow stand 106 with a view looking rearward can be used to properly center the watersport boat 200 on the trailer 100 during loading. In some variants, a camera 156 can be disposed on the bow stand 106 and capture a view of the coupling between the tongue 144 of the trailer 100 and the trailer hitch of the tow vehicle 101. In some variants, a camera 156 can be disposed on the starboard guide pole 102, port guide pole 104, and/or rear portion of the trailer 100 to capture a view behind and/or to the sides of the trailer 100, which can be advantageous when the user is backing up the trailer 100. In some variants, the view captured by the camera 156 can be shown via a display of the tow vehicle 101 in place of the backup camera of the tow vehicle 101, such as when the trailer wiring harness 146 is operatively connected to the tow vehicle wiring harness 105.

Figure 4E:
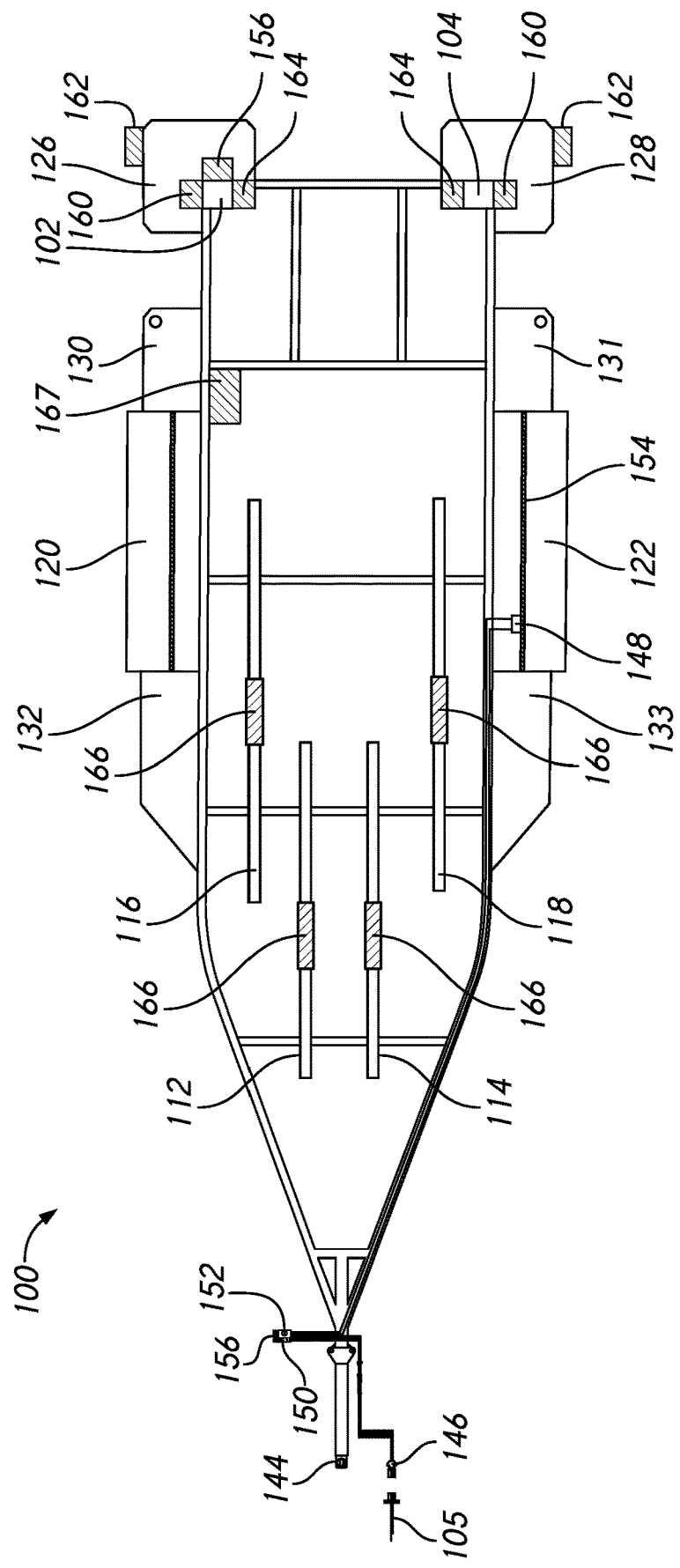
FIG. 4E schematically illustrates a view of the trailer with the depth sensor and one or more other sensors.

In some variants, the trailer 100, as illustrated in FIG. 4E, can include one or more proximity sensors 162. The one or more proximity sensors 162 can be disposed at various positions on the trailer 100. In some variants, the proximity sensor(s) 162 can be disposed on a rear portion of the trailer 100. The proximity sensors 162 can detect objects, people, and/or structures that are proximate the trailer 100, which can assist the user in avoiding collisions when towing the trailer 100. The proximity sensors 162 can determine when the trailer 100 is within a predetermined distance of an object, person, and/or structure. Upon detecting that the trailer 100 is within a predetermined distance of an object, person, and/or structure, the proximity sensor(s) 162 can send a signal to the control panel 156 and/or trailer controller 168, described in more detail herein, which can command the light(s) 160 and/or speaker(s) 152 to emit an alert indicating that the trailer 100 is in close proximity to an object, person, and/or structure. As described herein, other alerts can be sent to the display(s), speaker(s), and/or light(s) of the tow vehicle 101, watersport boat 200, and/or portable device of the user (e.g., smart phone) to indicate that the trailer 100 is within close proximity of an object, person, and/or structure.

In some variants, the trailer 100 can include one or more alignment sensors 164, which can be proximity sensor(s). The one or more alignment sensors 164 can be disposed on the starboard guide pole 102, the port guide pole 104, and/or one or more starboard or port positions on the trailer 100. The one or more alignment sensors 164 can detect the relative positioning between the watersport boat 200 and the trailer 100. The one or more alignment sensors 164 can detect when the watersport boat 200 is touching and/or within a predetermined distance of the starboard guide pole 102, port guide pole 104, and/or starboard or port sides of the trailer 100. Upon detecting via the alignment sensors 164 that the watersport boat 200 is touching and/or within a predetermined distance of the starboard guide pole 102, port guide pole 104, and/or alignment sensor(s) 164, the alignment sensors 164 can send a signal to the control panel 156 and/or trailer controller 168 which can command the light(s) 160 and/or speaker(s) 152 to emit an alert indicating that the watersport boat 200 is in close proximity to the starboard guide pole 102, port guide pole 104, and/or alignment sensor(s) 164, which can assist the user in centering the watersport boat 200 on the trailer 100. As described herein, other alerts can be sent to the display(s), speaker(s), and/or light(s) of the tow vehicle 101, watersport boat 200, and/or portable device of the user (e.g., smart phone) to indicate the positioning of the watersport boat 200 relative to the starboard guide pole 102, port guide pole 104, one or more starboard or port positions on the trailer 100, and/or the alignment sensor(s) 164. In some embodiments, an image can be generated on the display(s) of the tow vehicle 101, watersport boat 200, and/or portable device of the user indicating the position of the watersport boat 200 between the starboard guide pole 102, port guide pole 104, and/or other features (e.g., a graphic of the position of the watersport boat 200 relative to the starboard guide pole 102 and the port guide pole 104).

In some variants, the trailer 100 can include one or more bunk sensors 166 that can detect whether the watersport boat 200 is properly positioned relative to the bunks. In some variants, a sensor 166 can be disposed on one or more of the rear starboard side bunk 116, rear port side bunk 118, front starboard side bunk 112, and/or front port side bunk 114. The bunk sensors 166 can be proximity sensors, mechanical buttons/switches, pressure sensors, presence sensors, optical sensors, and/or others to detect the hull 214 of the watersport boat 200. In some variants, the bunk sensors 166 can detect when the hull 214 is contacting and/or proximate a respective bunk. In some variants, the hull 214 is properly positioned when the bunk sensors 166 detect that the hull 214 is contacting and/or proximate both the rear starboard side bunk 116 and rear port side bunk 118 and/or the front starboard side bunk 112 and front port side bunk 114. The bunk sensors 166 can send a signal to the control panel 156 and/or trailer controller 168 which can command the light(s) 160 and/or speaker(s) 152 to emit an alert indicating the position of the watersport boat 200 relative to the bunks, which can include an indication that the watersport boat 200 is contacting and/or proximate or not contacting and/or proximate one or more of the bunk sensors 166. In some variants, other alerts can be sent to the display(s), speaker(s), and/or light(s) of the tow vehicle 101, watersport boat 200, and/or portable device of the user (e.g., smart phone) to indicate the positioning of the watersport boat 200 relative to the bunk sensors 166 (e.g., proper positioning, improper positioning, etc.). In some variants, a graphic of the positioning of the watersport boat 200 relative to the bunks can be displayed to the user and/or the status of one or more of the bunk sensors 166.

As described herein, the trailer wiring harness 146 can operatively connect to the tow vehicle wiring harness 105. The electronic features of the trailer 100 can be powered via the battery of the tow vehicle 101. In some variants, the trailer 100 can include a battery 167 that can power electronic features of the trailer 100. In some variants, data can be communicated between a controller of the tow vehicle 101 and a controller of the trailer 100 via the connection between the trailer wiring harness 146 and tow vehicle wiring harness 105 and/or wirelessly.

Figure 5:
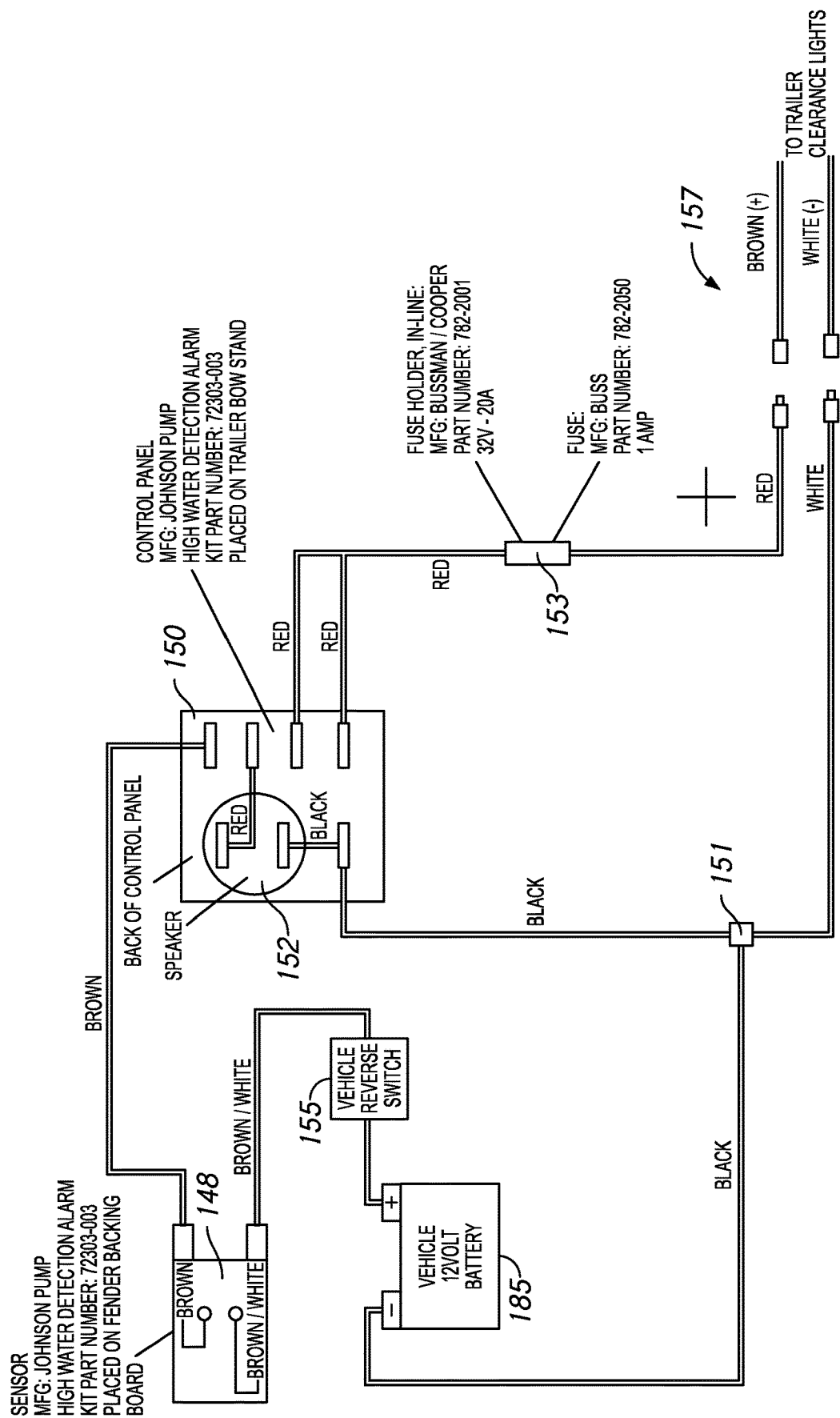
FIG. 5 illustrates an example wiring diagram.

FIG. 5 illustrates an example wiring diagram for the depth sensor 148, control panel 150, and vehicle battery 185 (e.g., 12V battery). The positive terminal on the vehicle battery 185 can be connected via a wired connection (e.g., brown/white) to the depth sensor 148. A vehicle reverse switch 155 can be disposed between the positive terminal on the vehicle battery 185 and the depth sensor 148. The depth sensor 148 can be connected via a wired connection (e.g., brown) to the control panel 150. The control panel 150 can include a speaker 152. In some variants, the speaker 152 is separate from the control panel 150. A wired connection (e.g., red), which can include an fuse holder 153 such as manufactured by Bussman/Cooper (part number: 782-2001, 32V-20A), can connect to trailer clearance lights, which can be via another wired connection (e.g., brown-positive). A wired connection (e.g., black) can connect the negative terminal of the vehicle battery 185 to a junction 151. A wired connection (e.g., black) can connect the control panel 150 to the junction 151. A wired connection (e.g., white) can connect to the trailer clearance lights, which can be via another wired connection (e.g., white-negative).

Figure 6:
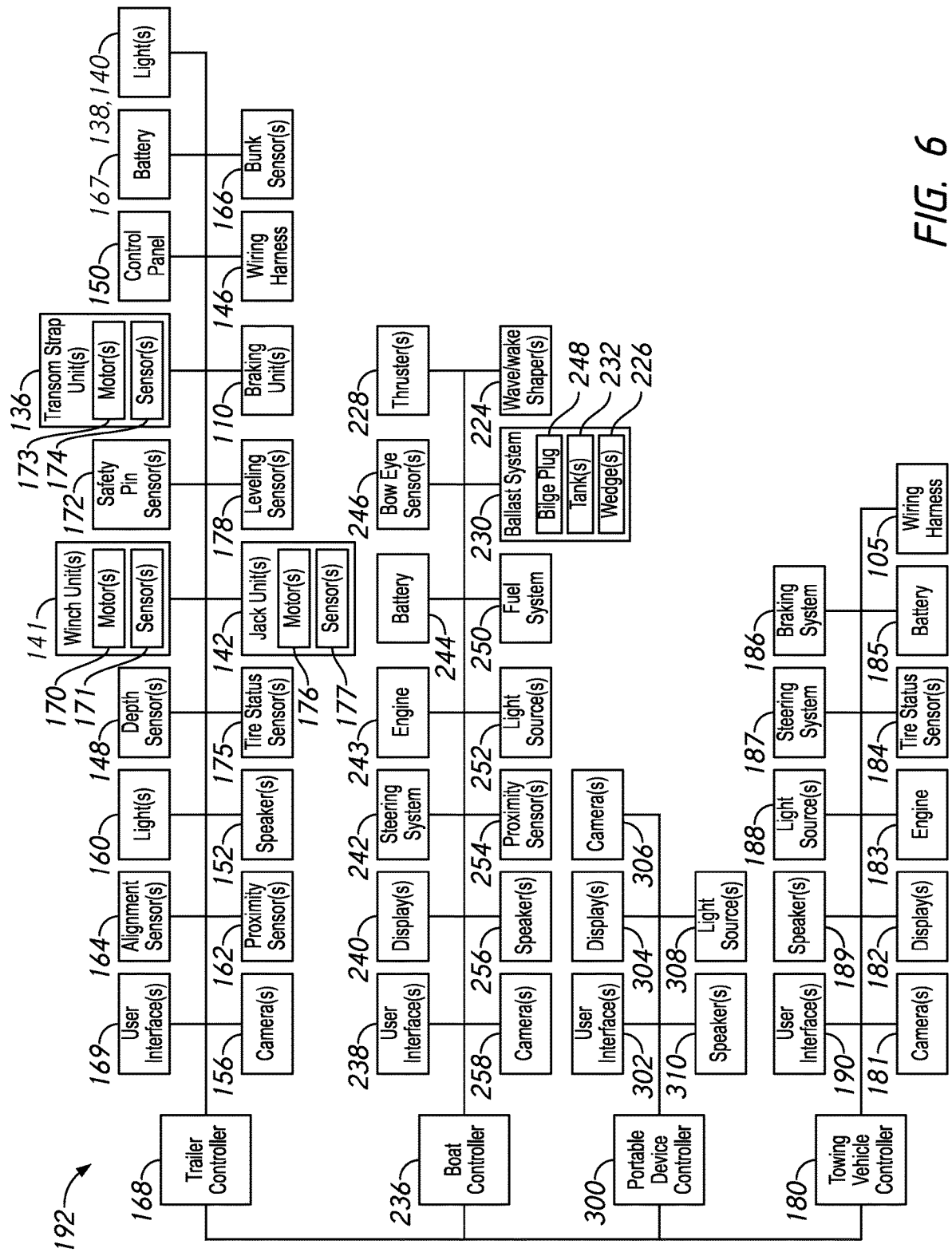
FIG. 6 illustrates an example control system.

FIG. 6 illustrates an example arrangement for a control system 192. The control system 192 can include a trailer controller 168, boat controller 236, portable device controller 300 (e.g., controller of a user's smart phone), and/or towing vehicle controller 180. The trailer controller 168, boat controller 236, portable device controller 300, towing vehicle controller 180, and/or other features illustrated in FIG. 6 can be in communication via a wired and/or wireless connection (e.g., Bluetooth, cellular data, etc.) to send and receive commands, data, signals, etc.

The trailer controller 168 can be in communication with user interface(s) 169, alignment sensor(s) 164, light(s) 160, depth senor(s) 148, winch unit(s) 141, safety pin sensor(s) 172, transom strap unit(s) 136, control panel 150, battery 167, lights 138, 140, camera(s) 156, proximity sensor(s) 162, speaker(s) 152, tire status sensor(s) 175, jack unit(s) 142, leveling sensor(s) 178, braking unit(s) 110, wiring harness 146, and/or bunk sensor(s) 166. The trailer controller 168 can, in some variants, be disposed within the control panel 150. The trailer controller 168 can include and/or be associated with the hardware and/or software to execute the methods described herein.

In some variants, the trailer 100 can include user interface(s) 169 that can have touchscreen(s), button(s), switch(es), dial(s), lever(s), etc. for controlling different features of the trailer 100. For example, the user may be able to control the light(s) 160, motor(s) 170 of the winch unit(s) 141, motor(s) 173 of the transom strap unit(s) 136, motor(s) 176 of the jack unit(s) 142, speaker(s) 152, and/or camera(s) 156. In some variants, the user may be able to control other features of the watersport boat 200 and/or tow vehicle 101 via the user interface(s) 169.

As described herein, the trailer 100 can include alignment sensor(s) 164, which can be proximity sensor(s), to help the user center the watersport boat 200 on the trailer 100. The alignment sensor(s) 164 can detect the positioning of the watersport boat 200 relative to the port and/or starboard sides of the trailer 100. For example, the alignment sensor(s) 164 can detect if the watersport boat 200 is at a suitable distance, which can be a range, relative to the alignment sensor(s) 164 for proper centering. In some variants, the alignment sensor(s) 164 can be disposed on the starboard guide pole 102 and/or the port guide pole 104 to detect the positioning of the watersport boat 200 relative to the starboard guide pole 102 and/or the port guide pole 104. In some variants, the alignment sensor(s) 164 can send signals, which can include alerts and/or data, to the control panel 150 and/or trailer controller 168 indicative of the detected alignment of the watersport boat 200. The control panel 150 and/or trailer controller 168 can generate an alert (e.g., message) indicative of the positioning of the watersport boat 200 relative to the alignment sensor(s) 164. In some variants, the trailer controller 168 can generate an alert when the watersport boat 200 is properly centered relative to the alignment sensor(s) 164 and another alert when the watersport boat 200 is not properly centered. The trailer controller 168 can send a command to the light(s) 160 and/or speaker(s) 152 of the trailer 100 to communicate to the user the alignment status of the watersport boat 200 relative to the trailer 100. For example, the controller 168 may command the light(s) 160 to emit light (e.g., color, flashing pattern, etc.) and/or the speaker(s) 152 to emit audio data (e.g., sounds, audible voice data) indicative of proper centering of the watersport boat 200 on the trailer 100.

In some variants, the trailer controller 168 can send data to the boat controller 236, portable device controller 300, and/or towing vehicle controller 180 indicative of the alignment of the watersport boat 200 relative to the trailer 100, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, a graphic can be displayed on one or more of the display(s) 240, display(s) 304, and/or display(s) 182 that represents the positioning of the watersport boat 200 on the trailer 100, which can be in real time. In some variants, text data can be displayed on one or more of the display(s) 240, display(s) 304, and/or display(s) 182 and/or audio data can be emitted by one or more of the speaker(s) 256, speaker(s) 310, and/or speaker(s) 189 to indicate the positioning of the watersport boat 200 on the trailer 100 and/or the suggested movement of the watersport boat 200 for centering on the trailer 100 (e.g., move watersport boat 200 in the starboard direction, port direction, etc.). In some variants, the boat controller 236 can command the steering system 242, thruster(s) 228, and/or engine 243 to automatically center the watersport boat 200 on the trailer 100 based on the alignment of the watersport boat 200 on the trailer 100 detected by the alignment sensor(s) 164, bunk sensor(s) 166, and/or other sensors described herein.

As described herein, the trailer 100 can include depth sensor(s) 148 which can detect the depth of the trailer 100 within water. In some variants, the depth sensor(s) 148 can detect when the trailer 100 is at a predetermined suitable depth and/or within a predetermined suitable range of depths in the water. In some variants, the depth sensor(s) 148 can detect whether the depth sensor(s) 148 is within (e.g., submerged in) and/or contacting water. In some variants, the depth sensor(s) 148 can send a signal, which can include data, to the control panel 150 and/or trailer controller 168 indicative that the depth sensor(s) 148 is within water and/or the depth detected by the depth sensor(s) 148. In some variants, the control panel 150 and/or trailer controller 168 can generate an alert when the depth sensor(s) 148 detects that the trailer 100 is at a suitable depth, within a suitable range of depths in the water, and/or that the depth sensor(s) 148 is within water. The trailer controller 168 can send a command to the light(s) 160 and/or speaker(s) 152 of the trailer 100 to communicate to the user that the trailer 100 is or is not at a suitable depth. For example, the trailer controller 168 may command the light(s) 160 to emit light (e.g., color, flashing pattern, etc.) and/or the speaker(s) 152 to emit audio data (e.g., sounds, audible voice data) to indicate that the trailer 100 is or is not at a suitable depth.

In some variants, the trailer controller 168 can send data to the boat controller 236, portable device controller 300, and/or towing vehicle controller 180 indicative that the depth sensor(s) 148 is within or not within water and/or the depth of the trailer 100 detected by the depth sensor 148, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, a graphic can be displayed on one or more of the display(s) 240, display(s) 304, and/or display(s) 182 that represents the depth of the trailer 100, which can be in real time. In some variants, text data can be displayed on one or more of the display(s) 240, display(s) 304, and/or display(s) 182 and/or audio data can be emitted by one or more of the speaker(s) 256, speaker(s) 310, and/or speaker(s) 189 to indicate the depth of the trailer 100 (e.g., too shallow, too deep, suitable depth, etc.) and/or the suggested movement of the trailer 100 and/or tow vehicle 101 (e.g., move trailer 100 to shallower position, pull tow vehicle 101 forward on ramp 103, move trailer 100 to deeper position, back tow vehicle 101 further down ramp, etc.). In some variants, the towing vehicle controller 180 can command the steering system 187, braking system 186, and/or engine 183 to automatically move the tow vehicle 101 up and/or down a boat ramp 103 to position the trailer 100 at a suitable depth in the water as detected by the depth sensor(s) 148.

As described herein, the trailer 100 can include one or more cameras 156. The camera(s) 156 can be disposed at various locations on the trailer 100. In some variants, camera(s) 156 can be disposed on the bow stand 106 and capture a forward view of the coupling between the tongue 144 of the trailer 144 and the hitch of the tow vehicle 101 and/or capture a rear view of the trailer 100. In some variants, the camera(s) 156 can be disposed on a rear portion of the trailer 100 to capture a view to the rear and/or sides of the trailer 100. In some variants, a signal, which can include audio and/or visual data, can be sent from the camera(s) 156 to the control panel 150 and/or trailer controller 168. In some variants, the trailer controller 168 can communicate the data (e.g., visual, audio data) received from the camera(s) to the boat controller 236, portable device controller 300, and/or towing vehicle controller 180, which can display the view captured by the camera(s) 156 to the user via the display(s) 240, display(s) 304, and/or display(s) 182 and/or emit the audio data captured by the camera(s) 156 to the user via the speaker(s) 256, speaker(s) 310, and/or speaker(s) 189. In some variants, the rear and/or side view(s) captured by the camera(s) 156 disposed on the trailer 100 can replace the views from the backup camera(s) 181 of the tow vehicle 101 when the trailer wiring harness 146 is operatively connected to the tow vehicle wiring harness 105. This can allow the user to see the view behind the trailer 100, which can be useful when backing the trailer 100 up with the tow vehicle 101.

The view(s) captured by the camera(s) 156 can help the user center the watersport boat 200 on the trailer 100 by allowing the user to see the positioning of the watersport boat 200 relative to the trailer 100 from one or more perspectives. For example, the camera(s) 156 positioned on the bow stand 106 looking rearward can help the user see the alignment of the watersport boat 200 relative to the trailer 100 from the front. The view of the coupling between the tongue 144 and the hitch of the tow vehicle 101 can enable the user to visually verify that the trailer 100 is indeed hitched to the tow vehicle 101. In some variants, the view captured by the camera(s) 156 can enable the user to steer the trailer 100 when not coupled to the tow vehicle 101, as described in more detail herein. In some variants, the towing vehicle controller 180 can perform automatic driving via the steering system 187, braking system 186, and/or engine 183 based, at least in part, on the visual data captured by the camera(s) 156. In some variants, one or more camera(s) 156 can provide a 360 view or substantially 360 view around the trailer 100 which can be displayed to the user via one or more of the displays described herein.

The trailer 100 can include one or more proximity sensor(s) 162, as described herein. The proximity sensor(s) 162 can be disposed at various positions on the trailer 100. The proximity sensor(s) 162 can detect when the trailer 100 is at or within a predetermined distance of an object, person, and/or structure. In some variants, the proximity sensor(s) 162 can send a signal, which can include data, to the control panel 150 and/or trailer controller 168 indicative that the trailer 100 is at or within a predetermined distance of an object, person, and/or structure. In some variants, the trailer controller 168 can send a command to the light(s) 160 and/or speaker(s) 152 of the trailer 100 to communicate to the user that the trailer 100 is at or within a predetermined distance of an object, person, and/or structure. For example, the trailer controller 168 may command the light(s) 160 to emit light (e.g., color, flashing pattern, etc.) and/or the speaker(s) 152 to emit audio data (e.g., sounds, audible voice data) to indicate that the trailer 100 in close proximity to an object, person, and/or structure.

In some variants, the trailer controller 168 can send data to the boat controller 236, portable device controller 300, and/or towing vehicle controller 180 indicative that the trailer 100 is in close proximity to an object, person, and/or structure as detected by the proximity sensor(s) 162, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, text data can be displayed on one or more of the display(s) 240, display(s) 304, and/or display(s) 182 and/or audio data can be emitted by one or more of the speaker(s) 256, speaker(s) 310, and/or speaker(s) 189 to indicate that the trailer 100 is within close proximity of an object, person, and/or structure. In some variants, the towing vehicle controller 180 can perform automatic driving via the steering system 187, braking system 186, and/or engine 183 based, at least in part, on the signals from the proximity sensor(s) 162.

The trailer 100 can include bunk sensor(s) 166, as described herein. The bunks sensor(s) 166 can be disposed on one or more bunks or rollers of the trailer 100. The bunk sensor(s) 166 can detect when the hull 214 of the watersport boat 200 is or is not contacting one or more bunks, when the hull 214 is or is not at and/or within a predetermined distance of the one or more bunks, and/or the distance between the hull 214 and the one or more bunks. The bunk sensor(s) 166 can be used to determine that the watersport boat 200 is properly centered on the trailer 100 and/or properly positioned on the bunks (e.g., caught by the bunks). In some variants, the bunk sensor(s) 166 can send a signal, which can include data, to the control panel 150 and/or the trailer controller 168 indicative of the position of the hull 214 of the watersport boat 200 relative to the bunk sensor(s) 166. In some variants, the trailer controller 168 can send a command to the light(s) 160 and/or speaker(s) 152 of the trailer 100 to communicate to the user the positioning of the hull 214 relative to the bunk sensor(s) 166 (e.g., that the hull 214 is caught by the bunks, that the hull 214 is properly centered on the trailer 100). For example, in some variants, the trailer controller 168 may command the light(s) 160 to emit light (e.g., color, flashing pattern, etc.) and/or the speaker(s) 152 to emit audio data (e.g., sounds, audible voice data) to indicate that the watersport boat 200 is properly positioned on the bunks of the trailer 100.

In some variants, the trailer controller 168 can send data to the boat controller 236, portable device controller 300, and/or towing vehicle controller 180 indicative that the hull 214 is or is not contacting one or more bunks, the hull 214 is or is not at and/or within a predetermined distance of the one or more bunks, and/or the distance between the hull 214 and the one or more bunks, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188).

In some variants, a graphic can be displayed on one or more of the display(s) 240, display(s) 304, and/or display(s) 182 that represents the detected positioning of the hull 214 of the watersport boat 200 relative to the bunks of the trailer 100, which can be in real time. In some variants, text data can be displayed on one or more of the display(s) 240, display(s) 304, and/or display(s) 182 and/or audio data can be emitted by one or more of the speaker(s) 256, speaker(s) 310, and/or speaker(s) 189 to indicate the positioning of the hull 214 of the watersport boat 200 relative to the bunks and/or the suggested movement of the watersport boat 200 (e.g., move watersport boat 200 in the starboard, forward, and/or port directions). In some variants, the boat controller 236 can command the steering system 242, engine 243, and/or thruster(s) 228 to automatically move the watersport boat 200 based, at least in part, on the position of the hull 214 with respect to the bunks, which can include the bunks sensor(s) 166.

The trailer 100 can include winch unit(s) 141, as described herein. The winch unit(s) 141 can be disposed on the front portion of the trailer, such as the bow stand 106. The winch unit(s) 141 can include a cable or strap having a fastener that can couple to the bow eye 206 of the watersport boat 200. With the fastener coupled to the bow eye 206, the winch unit 141 can real in the cable or strap to pull the bow 202 of the watersport boat 200 against the bow stop 108 and/or pull the hull 214 securely onto/against the bunks of the trailer 100. The winch unit(s) 141 can include a hand lever to reel in the cable or strap. In some variants, the winch unit(s) 141 can include motor(s) 170 to automatically reel in the cable or strap. In some variants, the winch unit(s) 141 can be commanded by the user via a user interface of the winch unit(s) 141, user interface(s) 169, user interface(s) 238, user interface(s) 302, and/or user interface(s) 190 to real in or release the cable or strap. In some variants, the winch unit(s) 141 can include sensor(s) 171 to determine the amount of the cable or strap that is deployed and/or the resistance exerted on the motor(s) 170 as the cable or strap is wound in, which can be used to determine if the movement of the watersport boat 200 is being improperly impeded as the cable or strap is being reeled in to pull the watersport boat 200 into position. In some variants, the winch unit(s) 141 can send a signal, which can include data, to the trailer controller 168 indicative of the status of the winch unit(s) 140 (e.g., the amount of cable or strap that is deployed and/or the resistance exerted on the motor(s) 170). The trailer controller 168 can send a command to the light(s) 160 and/or speaker(s) 152 of the trailer 100 to communicate to the user the status of the winch unit(s) 141.

In some variants, the trailer controller 168 can send data to the boat controller 236, portable device controller 300, and/or towing vehicle controller 180 indicative of the status of the winch unit(s) 141, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, a graphic can be displayed on one or more of the display(s) 240, display(s) 304, and/or display(s) 182 that represents the status of the winch unit(s) 141, which can be in real time. In some variants, text data can be displayed on one or more of the display(s) 240, display(s) 304, and/or display(s) 182 and/or audio data can be emitted by one or more of the speaker(s) 256, speaker(s) 310, and/or speaker(s) 189 to indicate the status of the winch unit(s) 141 (e.g., cable is fully drawn in, cable is being recled in, winching complete, resistance on motors(s) 170 exceeds a predetermined level, etc.). In some variants, the fastener of the winch unit(s) 141 can include sensor(s) 171 to detect that the fastener is coupled to the bow eye 206, which can be communicated to the user via the methods described herein.

The watersport boat 200 can include bow eye sensor(s) 246. The bow eye sensor(s) 246 can be used to detect that the fastener of the winch unit(s) 141 is coupled to the bow eye 206. The bow eye sensor(s) 246 can send a signal, which can include data, to the boat controller 236 indicative of whether the fastener of the winch unit(s) 141 is or is not coupled to the bow eye 206. The boat controller 236 can send a command to the light source(s) 252, speaker(s) 256, and/or display(s) 240 of the watersport boat 200 to communicate to the user whether or not the fastener is coupled to the bow eye 206. In some variants, the boat controller 236 can send data to the trailer controller 168, portable device controller 300, and/or towing vehicle controller 180 indicative of the status of the coupling between the winch unit(s) 141 and the bow eye 206, which can be communicated to the user via the features of the trailer 100 (e.g., user interface(s) 169, speaker(s) 152, and/or light(s) 160), features of the user's portable device (e.g., display(s) 304, speaker(s) 310, and/or light source(s) 308), and/or features of the towing vehicle 180 (e.g., display(s) 182, speaker(s) 189, and/or light source(s) 188).

The trailer 100 can include safety pin sensor(s) 172. A safety pin can be used to ensure that the tongue 144 of the trailer 100 is securely coupled to the hitch of the tow vehicle 101 to help prevent inadvertent decoupling. In some variants, the trailer 100 can include safety pin sensor(s) 172 to detect whether the safety pin has been positioned to securely couple the tongue 144 to the hitch of the tow vehicle 101. The safety pin sensor(s) 172 can send a signal, which can include data, to the trailer controller 168 indicative of the presence or absence of the safety pin. In some variants, the trailer controller can send a command to the light(s) 160 and/or speaker(s) of the trailer 100 to communicate to the user the presence of absence of the safety pin. In some variants, the trailer controller 168 can send data to the boat controller 236, portable device controller 300, and/or towing vehicle controller 180 indicative that the absence or presence of the safety pin, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, the towing vehicle controller 180 will prohibit movement of the tow vehicle 101 if the safety pin is not detected by the safety pin sensor(s) 172.

The trailer 100 can include transom strap unit(s) 136, as described herein. The transom strap unit(s) 136 can be disposed on the rear portion of the trailer 100. The transom strap unit(s) 136 can include cables or straps having a fastener that can couple to the transom hook(s) 208. With the fastener coupled to the transom hook(s) 208, the transom strap unit(s) 136 can reel in the cable or strap to help secure the watersport boat 200 to the trailer 100. The transom strap unit(s) 136 can include a hand lever to reel in the cable or strap. In some variants, the transom strap unit(s) 136 can include motor(s) 173 to automatically reel in the cable or strap. In some variants, the transom strap unit(s) 136 can be commanded by the user via a user interface of the transom strap unit(s) 136, user interface(s) 169, user interface(s) 238, user interface(s) 302, and/or user interface(s) 190 to real in or release the cable or strap.

In some variants, the transom strap unit(s) 136 can include sensor(s) 174 to determine the amount of the cable or strap that is deployed and/or the resistance exerted on the motor(s) 173 as the cable or strap is wound in, which can be indicative that the cable or strap is not connected to the transom hook(s) 208 and/or other issues. In some variants, the transom strap unit(s) 136 can send a signal, which can include data, to the trailer controller 168 indicative of the status of the transom strap unit(s) 136 (e.g., the amount of cable or strap that is deployed and/or the resistance exerted on the motor(s) 173). The trailer controller 168 can send a command to the light(s) 160 and/or speaker(s) 152 of the trailer 100 to communicate to the user the status of the transom strap unit(s) 136.

In some variants, the trailer controller 168 can send data to the boat controller 236, portable device controller 300, and/or towing vehicle controller 180 indicative of the status of the transom strap unit(s) 136, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, a graphic can be displayed on one or more of the display(s) 240, display(s) 304, and/or display(s) 182 that represents the status of the transom strap unit(s) 136, which can be in real time. In some variants, text data can be displayed on one or more of the display(s) 240, display(s) 304, and/or display(s) 182 and/or audio data can be emitted by one or more of the speaker(s) 256, speaker(s) 310, and/or speaker(s) 189 to indicate the status of the transom strap unit(s) 136 (e.g., cable is fully drawn in, cable is being reeled in, resistance on motors(s) 173 exceeds a predetermined level, etc.). In some variants, the fastener of the transom strap unit(s) 136 can include sensor(s) 174 to detect that the fastener is coupled to the transom hook(s) 208, which can be communicated to the user via the methods described herein. In some variants, the transom hook(s) 208 can include a sensor to detect that the fastener of the transom hook(s) 208 is fastened thereto.

The trailer 100 can include jack unit(s) 142, as described herein. The jack unit(s) 142 can be disposed on a front portion of the trailer 100 and/or other portion(s). The jack unit(s) 142 can support the front portion of the trailer 100 when the tongue 144 of the trailer 100 is not coupled to the hitch of the tow vehicle 101. The jack unit(s) 142 can include a wheeled footing 145 or stand. The wheeled footing 145 can enable the trailer 100 to be moved while not hitched to the tow vehicle 101. The jack unit(s) 142 can include a support member 143 that can be extended or retracted to raise or lower the front portion of the trailer 100. In some variants, the support member 143 can be extended or retracted via a hand lever. In some variants, the jack unit(s) 142 can include motor(s) 176. The motor(s) 176 can automatically extend or retract the support member 143 to raise or lower the front portion of the trailer 100. In some variants, the motor(s) 176 can drive the wheeled footing 145 to move the trailer 100. In some variants, the motor(s) 176 can turn the wheeled footing 145 to provide automatic steering for the trailer. The jack unit(s) 142 can include sensor(s) 177 to detect the position of the support member 143 to determine the lift provided by the jack unit(s) 142. In some variants, the sensor(s) 177 can detect the resistance on the motor(s) 176 which can be used to determine if an obstruction is impeding movement of the wheeled footing 145 and/or support member 143.

In some variants, the jack unit(s) 142 can communicate, such as send data, to the trailer controller 168 indicative of the status of the jack unit(s) 142 (e.g., position of the support member 143, whether the wheeled footing 145 is being driven, etc.). In some variants, the trailer controller 168 can command the light(s) 160 and/or speaker(s) 152 of the trailer 100 to communicate to the user and/or observer the status of the jack unit(s) 142. For example, in some variants, the speaker(s) 152 may emit a beeping sound as the support member 143 is being extended or retracted or motor(s) 176 driven. In some variants, the light(s) 160 may emit light as the support member 143 is being extended or retracted or motor(s) 176 driven.

In some variants, the trailer controller 168 can send data to the boat controller 236, portable device controller 300, and/or towing vehicle controller 180 indicative of the status of the jack unit(s) 142, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, a graphic can be displayed on one or more of the display(s) 240, display(s) 304, and/or display(s) 182 that represents the status of the jack unit(s) 142 (e.g., extension of the support member 143, whether the wheeled footing 145 is being driven, etc.), which can be in real time. In some variants, the user may be able to steer the wheeled footing 145, extension/retraction of the support member 143, and/or control a braking system 110 via the user interface(s) 238, user interface(s) 302, and/or user interface(s) 190, which can enable the user to remotely control the movement of the trailer 100 when not coupled to the tow vehicle 101. In some variants, the user can control movement of the trailer 100 at least in part based on the view captured by the camera(s) 156 of the trailer 100. In some variants, the user can control movement of the trailer 100 at least in part based on the view captured by the camera(s) 258 of the watersport boat 200.

The trailer 100 can include leveling sensor(s) 178. The leveling sensor(s) 178 can be used to determine the orientation of the trailer 100, which can include determining rotation about a transverse axis which may extend through one of the axles 158, 159 and/or rotation about a center longitudinal axis of the trailer 100 which may extend through the tongue 144 of the trailer 100. In some variants, a leveling sensor 178 can be positioned on the forward portion of the trailer 100 (e.g., forward of one or more of the axles 158, 159), a leveling sensor 178 can be positioned on the rear portion of the trailer 100 (e.g., behind one or more of the axles 158, 159), a leveling sensor 178 can be positioned on the starboard side of the trailer 100, and/or a leveling sensor 178 can be positioned on the port side of the trailer 100. In some variants, the leveling sensor(s) 178 can communicate data to the trailer controller 168 indicative of the orientation of the trailer 100. In some variants, the trailer controller 168 can send a command to the user interface 169 (which can include a display) to display via graphics and/or text the orientation of the trailer 100.

In some variants, the trailer controller 168 can send data to the boat controller 236, portable device controller 300, and/or towing vehicle controller 180 indicative of the orientation of the trailer 100, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). In some variants, a graphic and/or text can be displayed on one or more of the display(s) 240, display(s) 304, and/or display(s) 182 that represents the orientation of the trailer 100, which can be in real time. In some variants, the trailer controller 168, if the trailer 100 is not hitched to the tow vehicle 101, can command the jack unit(s) 176 to extend or retract the support member 143 based on the orientation detected by the leveling sensor 178.

The trailer 100 can include tire status sensor(s) 175 that can monitor the status of the tires of the wheels 124 and/or wheeled mount 145. In some variants, the tire status sensor(s) 175 can monitor the tire pressure of one or more of the wheels 124 and/or wheeled mount 145. In some variants, the tire status sensor(s) 175 can monitor the distance (e.g., miles) traversed by the wheels 124 and/or wheeled mount 145, which can be used to notify the user that one or more tires may be ready for replacement. In some variants, the tire status sensor(s) 175 can communicate data to the trailer controller 168 which can be indicative of the tire pressure, distance (e.g., miles) traversed, and/or other information. In some variants, the trailer controller 168 can command the user interface 169 (which can include a display) to display visual data and/or the speaker(s) 152 to emit audio data indicative of the tire pressure of and/or miles traversed by a given tire of the wheels 124 and/or wheeled mount 145. In some variants, the trailer controller 168 may generate a message recommending the replacement of the tire of the one or more of the wheels 124 and/or wheeled mount 145 based on mileage traversed. In some variants, the trailer controller 168 can send data to the boat controller 236, portable device controller 300, and/or towing vehicle controller 180 indicating the recommendation to replace the tire of the wheels 124 and/or wheeled mount 145, tire pressure, and/or distance traversed, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188).

The trailer 100 can include braking units(s) 110 (e.g., emergency brakes), as described herein. The braking unit(s) 110 can include one or more hand operated brakes that can prevent and/or impede movement of the trailer 100. In some variants, the braking unit(s) 110 can be electronically operated, which can include being controlled by the user interface(s) 169, user interface(S) 238, user interface(S) 302, and/or user interface(s) 190. In some variants, the braking unit(s) 110 can send data indicative of whether the braking unit 110 is engaged or released to the trailer controller 168 which can indicate the status of the braking unit(s) 110 via the light(s) 160, speaker(s) 152, and/or user interface(s) 169 to the user. In some variants, the trailer controller 168 can send data to the boat controller 236, portable device controller 300, and/or towing vehicle controller 180 indicative of the status of the braking unit 110, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). For example, the user can receive a notification via the display(s) 304 of the user's phone indicating that the braking unit 110 is engaged or released. In some variants, the braking unit 110 can release when the trailer wire harness 146 is connected to the tow vehicle wiring harness 105 and the braking system 186 of the tow vehicle 101 is engaged (e.g., brake pedal of tow vehicle 101 is applied).

The trailer 100 can include light(s) 138, 140, as described herein. The light(s) 138, 140 can indicate that the tow vehicle is braking, turning, reversing, etc. In some variants, the trailer controller 168 can detect and/or receive a signal that the light(s) 138, 140 are no longer operating. The trailer controller 168 can send data to the boat controller 236, portable device controller 300, and/or towing vehicle controller 180 indicative of the operability of the light(s) 138, 140, which can be communicated to the user via the features of the watersport boat 200 (e.g., display(s) 240, speaker(s) 256, and/or light source(s) 252), features of the user's portable device (e.g., display(s) 304, speaker(s) 310, and/or light source(s) 308), and/or features of the towing vehicle 180 (e.g., display(s) 182, speaker(s) 189, and/or light source(s) 188). For example, in some variants, a message can be displayed on the display(s) 304 of the user's potable device (e.g., via an application on the user's phone) that one or both of the light(s) 138, 140 are not operating.

In some variants, the trailer 100 can include a battery 167, as described herein. The battery 167 can power the electronic features of the trailer 100. In some variants, the battery 167 can be charged by the tow vehicle 101. In some variants, the trailer 100 does not have a battery 167.

As described herein, the trailer 100 can include a trailer wiring harness 146 which can connect to the tow vehicle wiring harness 105. The connection between the trailer wiring harness 146 and tow vehicle wiring harness 105 can provide power to the features of the trailer 100. In some variants, data (e.g., signals) can be communicated between the trailer 100 and the tow vehicle 101 via the connection between the trailer wiring harness 146 and the vehicle wiring harness 105. In some variants, the trailer controller 168 and/or the towing vehicle controller 180 can send data to the portable device controller 300 of the user, which can be via an application on the user's phone, indicating that the trailer wiring harness 146 and the vehicle wiring harness 105 are connected. The portable device controller 300 can command the display(s) 304 and/or speaker(s) 310 to provide a message to the user that the trailer wiring harness 146 and tow vehicle wiring harness 105 are connected. In some variants, the towing vehicle controller 180 can command the display(s) 240 and/or speaker(s) 256 to provide a message to the user that the trailer wiring harness 146 and tow vehicle wiring harness 105 are connected.

In some variants, the user, via the user interface(s) 302 of the user's portable device, can view the status of the features illustrated in FIG. 6. For example, the user can request information via the user interface(s) 302 regarding the voltage of the boat battery 244, fuel level of the fuel system 250, and/or other information. The portable device controller 300 can receive the user's request and communicate with one or more of the trailer controller 168, boat controller 236, and/or towing vehicle controller 180 to obtain the requested information. The portable device controller can communicate the requested information visually (e.g., graphics, images, video feed, text, etc.) via the display(s) 304 and/or audibly (e.g., audio voice data) via the speaker(s) 310. The user can request information similarly via the user interface(s) 169, user interface(s) 238, and/or user interfaces(s) 190. The requested information can be displayed via the display(s) 240 and/or display(s) 182 and/or audibly emitted via the speaker(s) 152, speaker(s) 256, and/or speaker(s) 189. In some variants, the user can control one or more of the features of the trailer 100, watersport boat 200, and/or towing vehicle 101 via the user interface(s) 302, user interface(s) 169, user interface(s) 238, and/or user interfaces(s) 190.

The boat controller 236 can be in communication with the user interface(s) 238, display(s) 240, steering system 242, engine 243, battery 244, bow eye sensor(s) 246, thruster(s) 228, camera(s) 258, speaker(s) 256, proximity sensor(s) 254, light source(S) 252, fuel system 250, ballast system 230, and/or wave/wake shaper(s) 224. The boat controller 236 can include and/or be associated with the hardware and/or software to execute the methods described herein.

The watersport boat 200 can include proximity sensor(s) 254 that can be similar to the proximity sensor(s) 162. The proximity sensor(s) 254 can be disposed at various locations on the watersport boat 200, such as on the bow 202, stern 204, and/or positions therebetween. The proximity sensor(s) 254 can detect objects, people, and/or structures that are proximate the watersport boat 200, which can aid in avoiding collisions. The proximity sensor(s) 254 can determine when the watersport boat 200 is within a predetermined distance of an object, person, and/or structure. Upon detecting that the watersport boat 200 is within a predetermined distance of an object, person, and/or structure, the proximity sensor(s) 254 can send data (e.g., a signal) to the boat controller 236 indicative of the detection. The boat controller 236 can command the display(s) 240, speaker(s) 256, and/or light source(s) 252 to alert the user of the detection. In some variants, the proximity sensor(s) 254 can be used with the watersport boat 200 loaded on the trailer 100, which can provide increased proximity detection. For example, in some variants, the boat controller 236 can send data to the trailer controller 168, portable device controller 300, and/or towing vehicle controller 180 indicative of the detection, which can be communicated to the user via the features of the trailer 100 (e.g., speaker(s) 152, light(s) 160), features of the user's portable device (e.g., display(s) 304, speaker(s) 310, and/or light source(s) 308), and/or features of the towing vehicle 180 (e.g., display(s) 182, speaker(s) 189, and/or light source(s) 188).

In some variants, one or more camera(s) 258 of the watersport boat 200 can be disposed at varying positions, such as on the tower 212. The camera(s) 258 can be used to create a 360 view or substantially 360 view of the area around the watersport boat 200, trailer 100, and/or tow vehicle 101, which can be in combination with other camera(s) described herein.

The portable device controller 300, which can be the controller of a user's smart phone (e.g., IPhone, Android operated phone, etc.), can be in communication with the user interface(s) 302 (e.g., button(s), touchscreen(s), switch(es), etc.), display(s) 304 (e.g., touchscreen(s)), camera(s) 306, speaker(s) 310, and/or light source(s) 308. The portable device controller 300 can include and/or be associated with additional hardware and/or software to execute the methods described herein. The portable device controller 300 can run an application that can access and/or control the different features and/or systems described herein.

The towing vehicle controller 180 of the towing vehicle 101 can be in communication with the user interface(s) 190 (e.g., button(s), touchscreen(s), switch(es), etc.), speaker(s) 189, light source(s) 188, steering system 187, braking system 186, camera(s) 181, display(s) 182, engine 183, battery 185, tire status sensor(s) 184, and/or vehicle wiring harness 105. The towing vehicle controller 180 can include and/or be associated with additional hardware and/or software to execute the methods described herein.

Figure 7A:
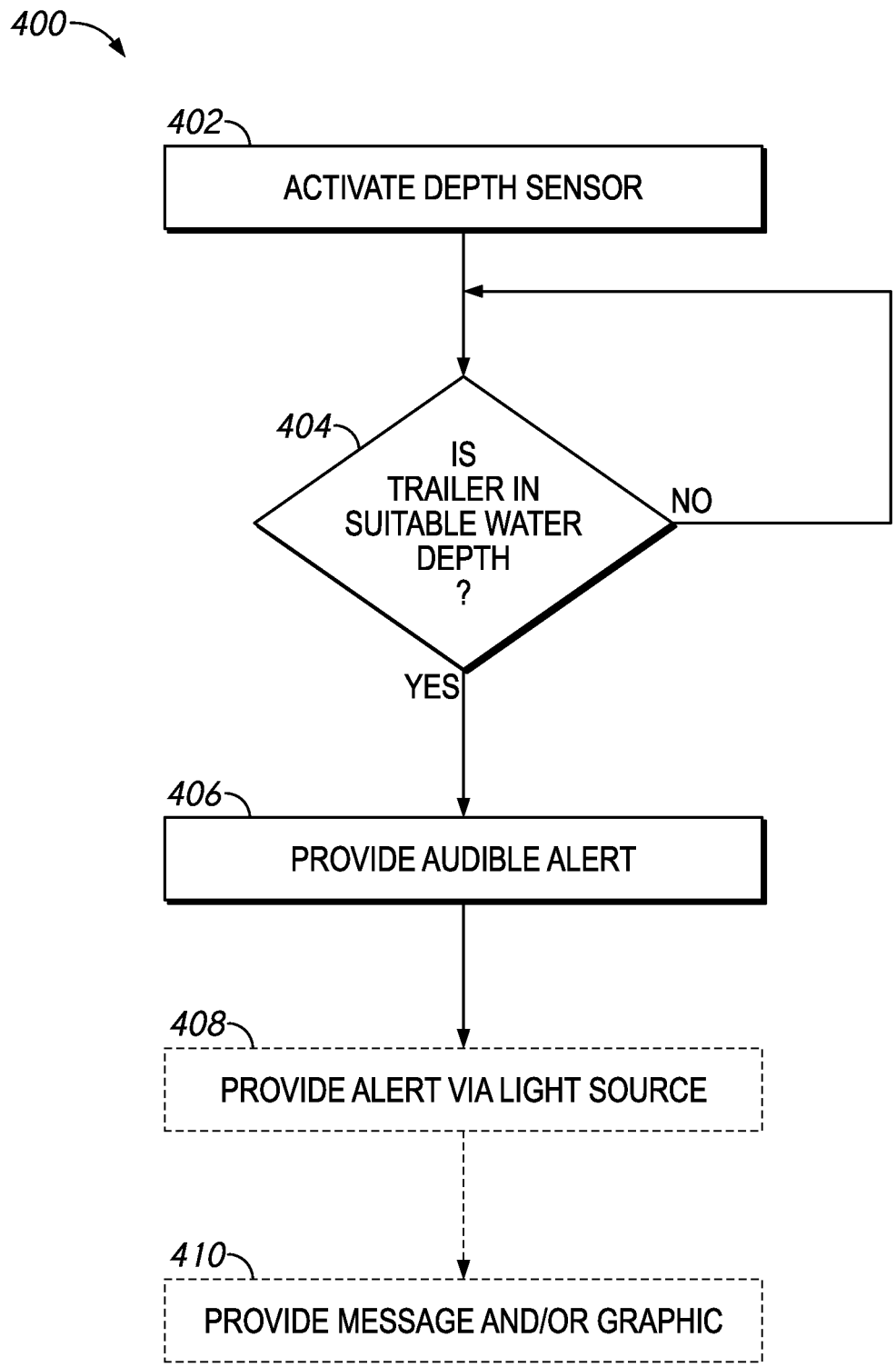
FIG. 7A is a flow chart of an example method for detecting and indicating that the trailer is within a suitable depth of water for launching and/or retrieving the watersport boat.

FIG. 7A illustrates an example method 400 for detecting and indicating that the trailer 100 is within a suitable depth of water for launching and/or retrieving the watersport boat 200. As described herein, the trailer 100 can be backed down a boat ramp 103 to launch or retrieve the watersport boat 200. The boat ramp 103 can include an inclined surface that gradually extends into the body of water to a greater depth. The trailer 100 can include a depth sensor 148 that can detect whether the trailer 100 is positioned at a suitable depth in the water. In some variants, the depth sensor 148 can detect whether the depth sensor 148 is within water and/or contacting water, which can indicate that the trailer 100 is within a suitable depth of water for launching or retrieving the watersport boat 200. In some variants, the depth sensor 148 can detect the depth of the depth sensor 148 within the water to determine whether the trailer 100 is within a suitable depth of water for launching or retrieving the watersport boat 200.

At block 402, the depth sensor 148 can be activated. In some variants, the depth sensor 148 is activated when the trailer wiring harness 146 is operatively connected to the tow vehicle wiring harness 105. In some variants, the depth sensor 148 is activated when the user manipulates a switch and/or button on the control panel 150 to arm the depth sensor 148. In some variants, the depth sensor 148 can be activated by the user via the user interface(s) 190 of the tow vehicle 101, user interface(s) 302 of the user's portable device (e.g., application on the user's smartphone), user interface(s) 238 of the watersport boat 200, and/or user interface(s) 169 of the trailer 100. In some variants, the depth sensor 148 can always be active.

At block 404, the depth sensor 148 can detect if the trailer 100 is in a suitable water depth. In some variants, the depth sensor 148 can detect if the depth sensor 148 is within water, which can indicate if the trailer 100 is at a suitable water depth. In some variants, the depth sensor 148 can detect the depth of the depth sensor 148 to determine that the trailer 100 is within a suitable water depth. In some variants, the depth sensor 148 can detect if the trailer 100 is at a predetermined depth and/or within a range of predetermined depths that are suitable for launching and/or retrieving the watersport boat 200 with the trailer 100. The predetermined depth can be based on the configuration of the trailer 100, location of the depth sensor 148 on the trailer 100, size of the wheels 124, and/or other factors. If the depth sensor 148 detects that the trailer 100 is not within a suitable depth of water the process can loop back to block 404.

If the depth sensor 148 determines that the trailer 100 is within a suitable depth of water, the process can proceed to block 406 and provide an audible alert indicating that the trailer 100 is within a suitable depth of water. In some variants, the depth sensor 148 can send a signal, which can include data, to the trailer controller 168 and/or control panel 150 indicating that the trailer 100 is at a suitable depth. The trailer controller 168 and/or control panel 150 can command the speaker(s) 152 to sound an alarm (e.g., alert, sounds, etc.) indicating to the user that the trailer 100 is within a suitable depth of water. The user can then stop backing the trailer 100 down the boat ramp 103 and into the water such that the trailer 100 is at a suitable depth. In some variants, the trailer controller 168 can send a signal, which can include data, to the boat controller 236, portable device controller 300, and/or towing vehicle controller 180 such that the boat controller 236 commands the speaker(s) 256 to emit an alarm, the portable device controller 300 commands the speaker(s) 310 to emit an alarm, and/or the towing vehicle controller 180 commands the speaker(s) 189 to emit an alarm.

The process can optionally proceed to block 408 and provide an alert via a light source. The trailer controller 168 and/or control panel 150 can command the light(s) 160, which can be disposed on the starboard guide pole 102 and/or port guide pole 104, to emit light (e.g., flash, pulse, etc.) to indicate that the trailer 100 is at a suitable depth in the water. In some variants, the trailer controller 168 can send a signal, which can include data, to the boat controller 236, portable device controller 300, and/or towing vehicle controller 180 such that the boat controller 236 commands the light source(s) 252 to emit light, the portable device controller 300 commands the light source(s) 308 to emit light, and/or the towing vehicle controller 180 commands the light source(s) 188 to emit light.

The process can optionally proceed to block 410 and provide a message and/or graphic to the user to indicate that the trailer 100 is at a suitable depth. The message and/or graphic can include a text message that provides that the trailer 100 is at a suitable depth and/or that the user should stop backing the trailer 100 down the boat ramp 103. The message and/or graphic can include a depiction of the trailer 100 within a suitable depth of water. In some variants, the trailer controller 168 can send a signal, which can include data, to the boat controller 236, portable device controller 300, and/or towing vehicle controller 180 such that the boat controller 236 commands the display(s) 240 to provide the message and/or graphic, the portable device controller 300 commands the display(s) 304 to provide the message and/or graphic, and/or the towing vehicle controller 180 commands the display(s) 182 to provide the message and/or graphic.

Figure 7B:
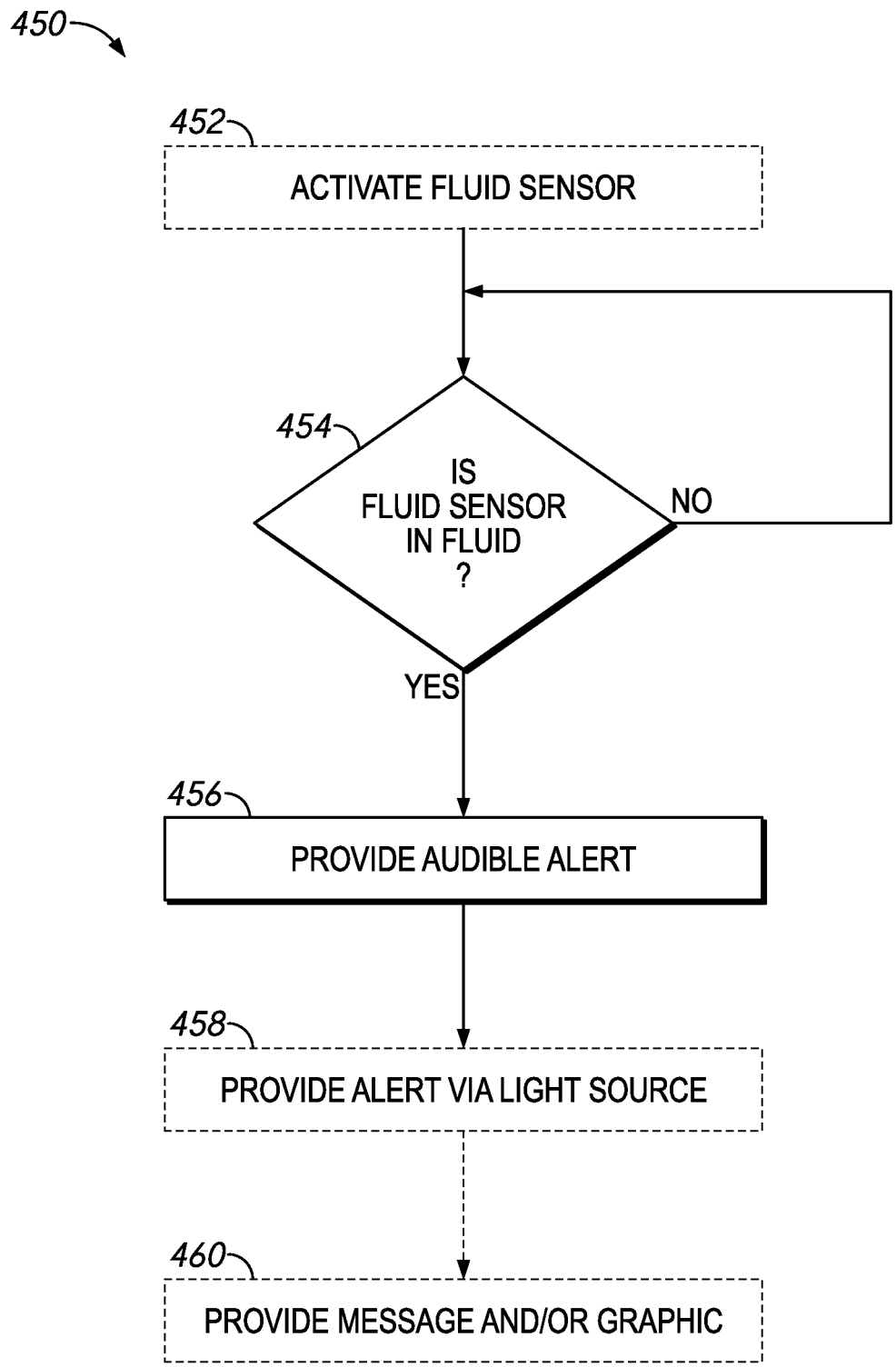
FIG. 7B is a flow chart of an example method for detecting and indicating that the trailer is within a suitable depth of water for launching and/or retrieving the watersport boat.

FIG. 7B illustrates an example method 450 for detecting and indicating that the trailer 100 is within a suitable depth of water for launching and/or retrieving the watersport boat 200. As described herein, the trailer 100 can include a depth sensor 148, which can also be referred to as a fluid sensor, that can detect whether the depth sensor 148 is submerged in and/or contacting water. The depth sensor 148 can be positioned at a height on the trailer 100 such that, when the depth sensor 148 is submerged in and/or contacting water, the trailer 100 is within a suitable depth of water to launch or retrieve a watersports boat 200. The installation height of the depth sensor 148 on the trailer 100 to detect suitable water depth can be determined based on the size of the trailer 100, wheels 124, watersport boat 200, etc.

Block 452 can be the same as described in reference to Block 402 of FIG. 7A.

At block 454, the depth sensor 148 can detect if the depth sensor 148 is submerged in and/or contacting water, which can indicate that the trailer 100 is within a suitable depth of water to launch and/or retrieve a watersport boat 200. If the depth sensor 148 does not detect that the depth sensor 148 is submerged in and/or contacting water, the process can loop back to block 454.

If the depth sensor 148 determines that the trailer 100 is within a suitable depth of water, the process can proceed to block 456 to provide an audible alert, which can be the same as described in reference to block 406 of FIG. 7A. The process can optionally proceed to block 458 and provide an alert via a light source, which can be the same as described in reference to block 408 of FIG. 7A. The process can optionally proceed to block 460 and provide a message and/or graphic, which can be the same as described in reference to block 410 of FIG. 7A.

Figure 8:
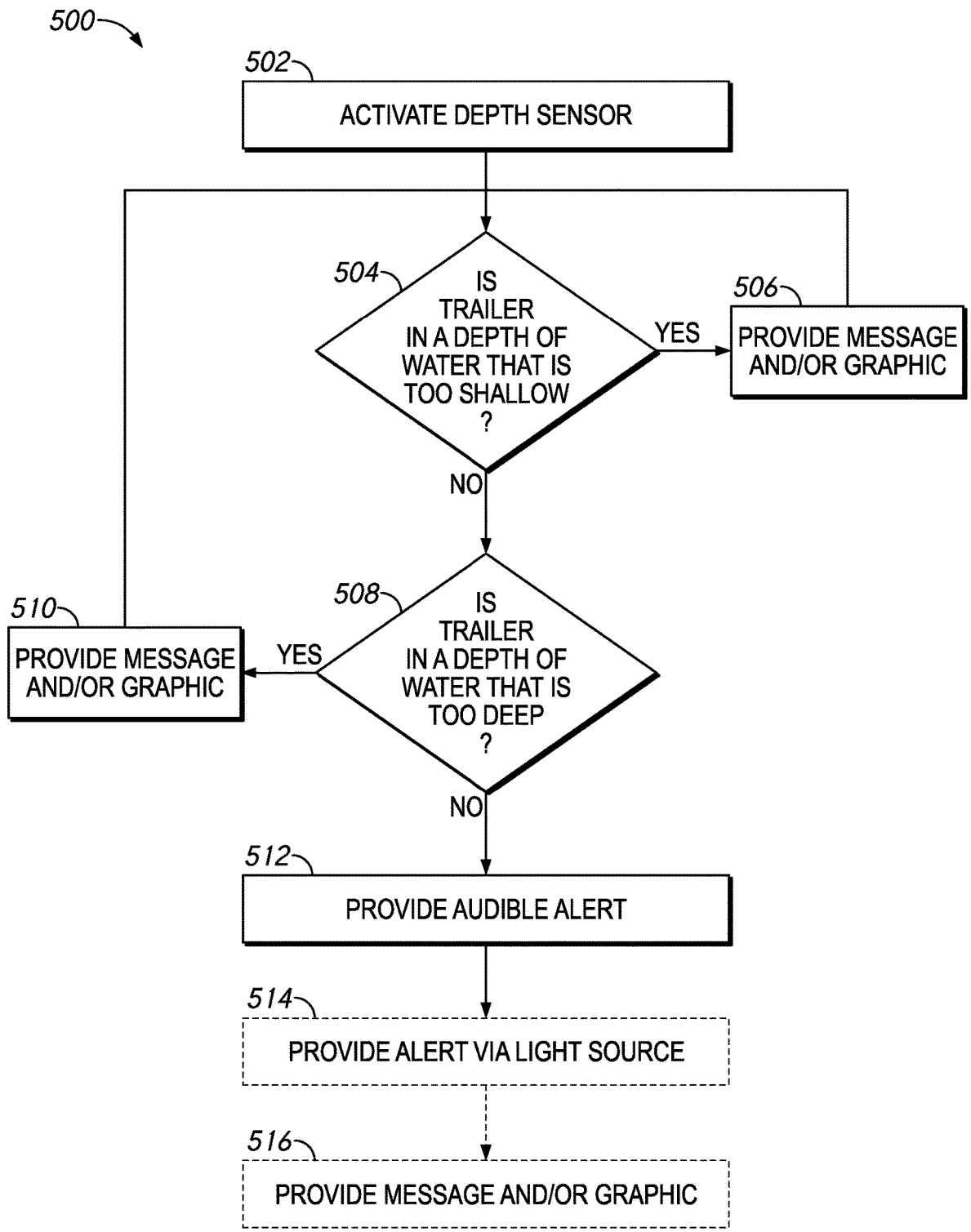
FIG. 8 is a flow chart of an example method for detecting and indicating that the trailer is within a suitable depth of water for launching and/or retrieving the watersport boat.

FIG. 8 illustrates an example method 500 for detecting and indicating that the trailer 100 is within a suitable depth of water for launching and/or retrieving the watersport boat 200. At block 502, the depth sensor 148 can be activated, which can be accomplished via the methods indicated in reference to block 402 in FIG. 7A.

At block 504, the depth sensor 148 can detect if the trailer 100 is in a depth of water that is too shallow for launching and/or retrieving the watersport boat 200. In some variants, the depth sensor 148 can detect the depth of the depth sensor 148 to determine that the trailer 100 is in a depth that is too shallow. In some variants, the depth sensor 148 can detect that the depth of water is below a predetermined depth, indicating that the trailer 100 is in a depth that is too shallow. The depth sensor 148 can send a signal, which can include data, indicating the detected water depth to the trailer controller 168. In some variants, the trailer controller 168 can determine if the detected water depth is too shallow based on a predetermined depth. In some variants, the depth sensor 148 can determine if the detected water depth is too shallow.

If the trailer 100 is at a depth that is too shallow, the process can proceed to block 506 and provide a message and/or graphic to the user. The message and/or graphic can include a message that provides that the trailer 100 is at too shallow of a depth and/or that the user continue backing the trailer 100 down the boat ramp 103 to a deeper depth. The message and/or graphic can include a depiction of the trailer 100 in a depth of water that is too shallow. In some variants, the trailer controller 168 can send a signal, which can include data, to the boat controller 236, portable device controller 300, and/or towing vehicle controller 180 such that the boat controller 236 commands the display(s) 240 to provide the message and/or graphic, the portable device controller 300 commands the display(s) 304 to provide the message and/or graphic, and/or the towing vehicle controller 180 commands the display(s) 182 to provide the message and/or graphic. In some variants, the trailer controller 168 can command the speaker(s) 152 to emit an audible indication that the trailer 100 is at a depth that is too shallow and/or that the user should continue backing the trailer 100 into deeper water. In some variants, the trailer controller 168 can send a signal, which can include data, to the boat controller 236, portable device controller 300, and/or towing vehicle controller 180 such that the boat controller 236 commands the speaker(s) 256 to emit an audible indication, the portable device controller 300 commands the speaker(s) 310 to emit an audible indication, and/or the towing vehicle controller 180 commands the speaker(s) 189 to emit an audible indication. The process can then proceed to block 504.

If the trailer 100 is not in a depth of water that is too shallow (e.g., the trailer 100 is in a depth of water exceeding a predetermined depth), the process can continue to block 508. At block 508, the depth sensor 148 can detect if the trailer 100 is in a depth of water that is too deep for launching and/or retrieving the watersport boat 200. In some variants, the depth sensor 148 can determine if the depth of water is too shallow or deep simultaneously. In some variants, the depth sensor 148 can detect the depth of the depth sensor 148 to determine that the trailer 100 is in a depth that is too deep. In some variants, the depth sensor 148 can detect that the depth of water is above a predetermined depth, indicating that the trailer 100 is in a depth that is too deep. The depth sensor 148 can send a signal, which can include data, indicating the detected water depth to the trailer controller 168. In some variants, the trailer controller 168 can determine if the detected water depth is too deep based on a predetermined depth. In some variants, the depth sensor 148 can determine if the water depth is too deep.

If the trailer 100 (e.g., depth sensor 148) is at a depth that is too deep, the process can proceed to block 510 and provide a message and/or graphic to the user. The message and/or graphic can include a text message that provides that the trailer 100 is at too deep of a depth and/or that the user pull the trailer 100 up the boat ramp 103 to a shallower depth. The message and/or graphic can include a depiction of the trailer 100 in a depth of water that is too deep. In some variants, the trailer controller 168 can send a signal, which can include data, to the boat controller 236, portable device controller 300, and/or towing vehicle controller 180 such that the boat controller 236 commands the display(s) 240 to provide the message and/or graphic, the portable device controller 300 commands the display(s) 304 to provide the message and/or graphic, and/or the towing vehicle controller 180 commands the display(s) 182 to provide the message and/or graphic. In some variants, the trailer controller 168 can command the speaker(s) 152 to emit an audible indication that the trailer 100 is at a depth that is too deep and/or that the user should pull the trailer 100 up the boat ramp 103 and into shallower water. In some variants, the trailer controller 168 can send a signal, which can include data, to the boat controller 236, portable device controller 300, and/or towing vehicle controller 180 such that the boat controller 236 commands the speaker(s) 256 to emit an audible indication, the portable device controller 300 commands the speaker(s) 310 to emit an audible indication, and/or the towing vehicle controller 180 commands the speaker(s) 189 to emit an audible indication. The process can then proceed to block 504.

If the depth sensor 148 determines that the trailer 100 (e.g., depth sensor 148) is not within a depth of water that is too deep, the process can proceed to block 512, which can be the same as block 406 described in reference to FIG. 7A, and provide an audible alert indicating that the trailer 100 is within a suitable depth of water. The process can optionally proceed to block 514, which can be the same as block 408 described in reference to FIG. 7A, and provide an alert via one or more light source(s). The process can optionally proceed to block 516, which can be the same as block 410 described in reference to FIG. 7A, and provide a message and/or graphic.

Figure 9:
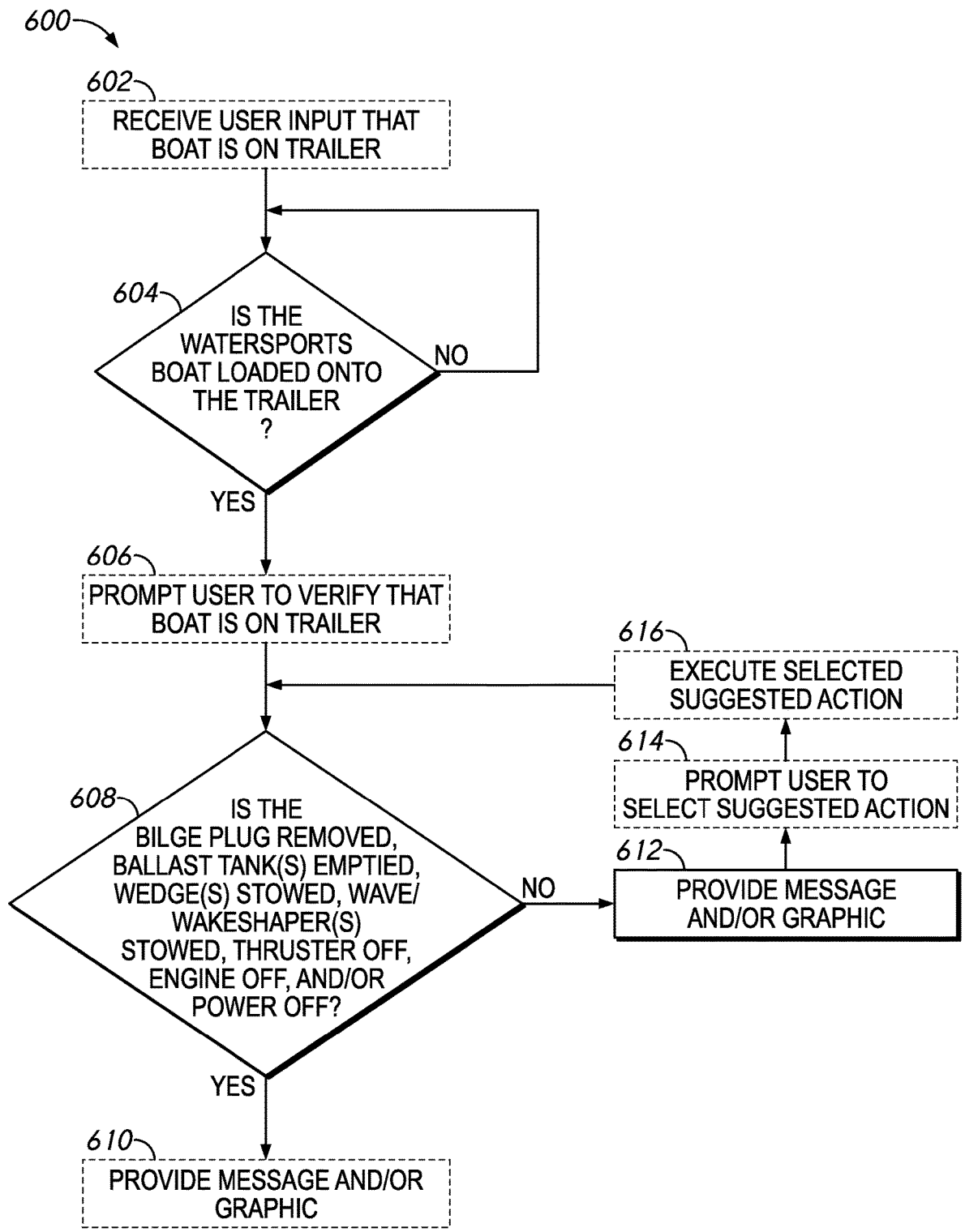
FIG. 9 is a flow chart of an example method for preparing the watersport boat for transportation on the trailer.

FIG. 9 illustrates an example method 600 for preparing the watersport boat 200 for transportation on the trailer 100. At block 602, user input can optionally be received via one or more of the user interface(s) 169, user interface(s) 238, user interface(s) 302, and/or user interface(s) 190 indicating that the watersport boat 200 is positioned on the trailer 100, which can begin the process described in reference to method 600. The process can proceed to block 604 and determine whether the watersport boat 200 is indeed positioned on the trailer 100. In some variants, block 602 is omitted and the process automatically determines whether the watersport boat 200 is positioned on the trailer 100 at block 604.

The trailer controller 168 and/or boat controller 236 can determine whether the trailer 100 is positioned on the trailer 100 via one or more of the camera(s) 156, alignment sensor(s) 164, bunk sensor(s) 166, and/or bow eye sensor(s) 246. In some variants, camera(s) 156 can have a view of the trailer 100 that via image recognition software and be used to determine whether the watersport boat 200 is positioned on the trailer. In some variants, alignment sensor(s) 164 can detect that the watersport boat 200 is positioned on the trailer and/or between a port and starboard alignment sensor(s) 164 disposed on the port and starboard sides of the trailer 100. In some variants, bunk sensor(s) 166 can detect that the hull 214 of the watersport boat 200 is in contact with the bunks, proximate the bunks, and/or centered on the trailer 100, as described herein. In some variants, the bow eye sensor(s) 246 can detect that the bow eye 206 is coupled to the winch unit 141. If the watersport boat 200 is not positioned on the trailer 100, the process can loop back to block 604. In some variants, a paired transmitter and receiver or paired transceivers (e.g., one transmitter or transceiver with the watersport boat 200 and one transmitter or transceiver with the trailer 100) can be employed to determine when the watersport boat 200 is proximate the trailer 100 as an indication that the watersport boat 200 is likely about to be loaded onto the trailer 100 and/or is loaded onto the trailer 100.

If the watersport boat 200 is on the trailer 100, the user can optionally be prompted to verify that the watersport boat 200 is loaded on the trailer. In some variants, the boat controller 236 can command the display(s) 240 to provide a prompt requesting that the user verify that the watersport boat 200 is on the trailer 100, the portable device controller 300 can command the display(s) 304 to provide a prompt requesting that the user verify that the watersport boat 200 is on the trailer 100, and/or the towing vehicle controller 180 can command the display(s) 182 to provide a prompt requesting that the user verify that the watersport boat 200 is on the trailer 100. The user can optionally verify that the watersport boat 200 is on the trailer 100 via one or more of the user interface(s) 238, user interface(s) 302, and/or user interface(s) 190.

The process can proceed to block 608. At block 608, the boat controller 236 can determine whether the watersport boat 200 is prepared for transportation via towing. In some variants, the boat controller 236 can determine that the bilge plug 248 of the ballast system 230 is removed such that water is drained from the ballast tank(s) 232. In some variants, the boat controller 236 can verify that the ballast tank(s) 232 are empty. In some variants, the boat controller 236 can determine that the wedge(s) 226 is stowed. In some variants, the boat controller 236 can determine that the wave/wakeshaper(s) 224 are stowed. In some variants, the boat controller 236 can determine that the thruster 228 is off. In some variants, the boat controller 236 can determine that the engine 243 is off. In some variants, the boat controller 236 can determine that the power of the watersport boat 200 is off (e.g., power from the battery 244 is not being used).

If the one or more of the conditions described in reference to block 608 is not met, the process can continue to block 612 and a message and/or graphic can be provided to the user. The message and/or graphic can include a text message that provides that one or more of the conditions detailed with respect to block 608 is not met. The message and/or graphic can include a graphic to help illustrate the unmet condition (e.g., illustration of the wedge(s) 226 in a deployed position rather than a stowed position). In some variants, the boat controller 300 can command the display(s) 240 to provide the message and/or graphic, the portable device controller 300 can command the display(s) 304 to provide the message and/or graphic, and/or the towing vehicle controller 180 can command the display(s) 182 to provide the message and/or graphic. At block 614, the user can optionally be prompted to select a suggested action to remedy the unmet condition (e.g., remove the bilge plug 248, empty the ballast tank(s) 232, stow the wedge(s) 226, stow the wave/wakeshaper(s) 224, turn off the thruster(s) 228, turn off the engine 243, and/or turn off the power of the watersport boat 200, which the user can select to execute via the user interface(s) 169, user interface(s) 238, user interface(s) 302, and/or user interface(s) 190.

The process can optionally proceed to block 616 and execute the selected suggested action by the user. In some variants, the boat controller 300 can remove the bilge plug 248, empty the ballast tank(s) 232, stow the wedge(s) 226, stow the wave/wakeshaper(s) 224, turn off the thruster(s) 228, turn off the engine 243, and/or turn off the power of the watersport boat 200 as indicated by the user. The process can then proceed to return to block 608.

If the boat controller 300 determines that the conditions described in reference to block 608 are met, the process can proceed to block 610 and provide a message and/or graphic to the user. The message and/or graphic can include a message (e.g., text, graphics, etc.) that provides that the watersport boat 200 is prepared for transportation via towing. The message and/or graphic can include a depiction of the prepared watersport boat 200. In some variants, the boat controller 236 commands the display(s) 240 to display the message and/or graphic. In some variants, the boat controller 300 can send a signal, which can include data, to the portable device controller 300 and/or towing vehicle controller 180 such that the portable device controller 300 commands the display(s) 304 to provide the message and/or graphic and/or the towing vehicle controller 180 commands the display(s) 182 to provide the message and/or graphic.

Figure 10:
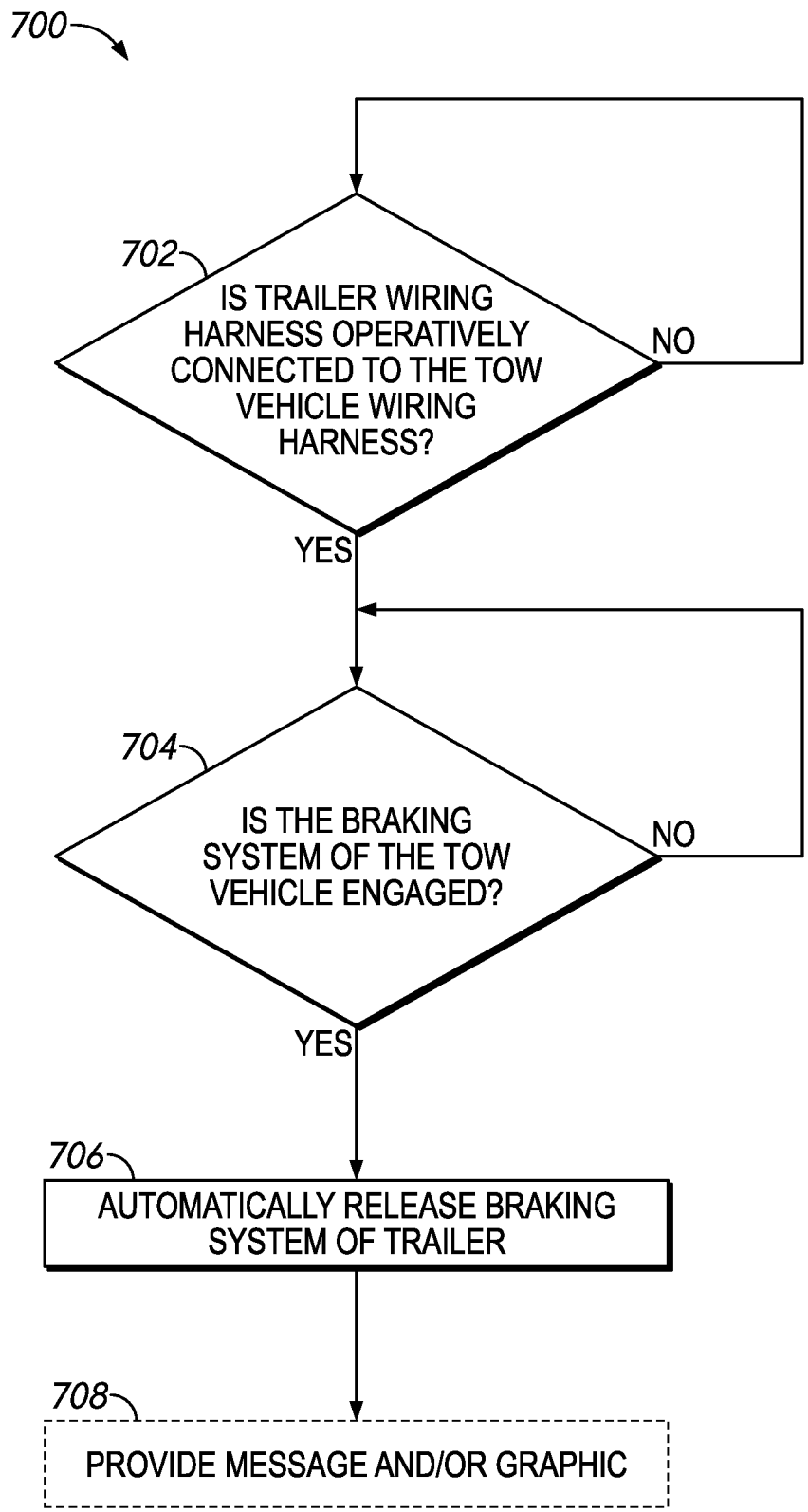
FIG. 10 is a flow chart of an example method for automatically controlling the braking units of the trailer.

FIG. 10 illustrates an example method 700 for automatically controlling the braking units 110 (e.g., emergency brake(s)) of the trailer 100. At block 702, the control system 192 (e.g., the trailer controller 168 and/or the towing vehicle controller 180) can determine if the trailer wiring harness 146 is operatively connected to the tow vehicle wiring harness 105. If the trailer wiring harness 146 is not operatively connected to the tow vehicle wiring harness 105, the process can loop back to block 702. If the trailer wiring harness 146 is operatively connected to the tow vehicle wiring harness 105, the control system 192 (e.g., towing vehicle controller 180) can determine whether the braking system 186 of the tow vehicle 101 is engaged (e.g., brake pedal engaged). If the braking system 186 of the tow vehicle 101 is not engaged, the process can loop back to block 704. If the braking system 186 of the tow vehicle 101 is engaged, the control system 192 via the trailer controller 168 can command the braking unit(s) 110 to release.

At block 708, the control system 192 can optionally provide a message and/or graphic to the user that the braking unit(s) 110 of the trailer 100 have been released. The message and/or graphic can include a depiction of the released braking unit(s) 110 of the trailer 100. In some variants, the portable device controller 300 can command the display(s) 304 to provide the message and/or graphic and/or the towing vehicle controller 180 can command the display(s) 182 to provide the message and/or graphic. In some variants, the portable device controller 300 can command the speaker(s) 310 to emit an audible indication that the braking unit(s) 110 are released and/or the towing vehicle controller 180 can commands the speaker(s) 189 to emit an audible indication that the braking unit(s) 110 are released.

Terminology

Although this disclosure has been described in the context of certain embodiments and examples, a person of ordinary skill in the art would recognize, after reviewing the disclosure herein, that any embodiment disclosed can be combined with other embodiments, portions/aspects of other embodiments, and/or technologies known in the art to accomplished the desired advantages discussed herein. It will be understood by those skilled in the art, after reviewing the disclosure herein, that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art after reviewing the disclosure herein. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Reference is made to boat ramps and inclined surfaces that can be used to launch/retrieve a boat. One of ordinary skill in the art, after reviewing the disclosure herein, will understand that the inclination angle of a boat ramp or inclined surface can impact use of the depth sensor in detecting a suitable depth for launching or retrieving a boat. For example, on a steep incline, the rear of the trailer may be deeper in the water when the depth sensor detects that the trailer is at a suitable depth. On a more gradual incline, the rear of the trailer may be shallower in the water when the depth sensor detects that the trailer is at a suitable depth. In some variants, leveling sensors of the trailer can determine the inclination angle of the trailer and adjust the depth that constitutes a suitable depth based on the inclination angle. For example, the suitable depth may be shallower for a steep incline or deeper for a more gradual incline. In some variants, the user may be able to adjust the depth that constitutes a suitable depth. In some variants, the user may frequently use the same boat ramp or inclined surface and the depth that constitutes a suitable depth can be adjusted (via user input and/or automatically) based on the inclination angle of the boat ramp or inclined surface.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate after reviewing the disclosure herein that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize, after reviewing the disclosure herein, that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "and/or" has similar meaning in that when used, for example, in a list of elements, the term "and/or" means one, some, or all of the elements in the list, but does not require any individual embodiment to have all elements.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately." "about," "generally." and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Values and ranges of values disclosed herein are examples and should not be construed as limiting. The values and ranges of values disclosed herein can be altered while gaining the advantages discussed herein. The listed ranges of values disclosed herein can include subsets of ranges or values which are part of this disclosure. Disclosed ranges of values or a single value for one feature can be implemented in combination with any other compatible disclosed range of values or value for another feature. For example, any specific value within a range of dimensions for one element can be paired with any specific value within a range of dimensions for another element. One of ordinary skill in the art will recognize from the disclosure herein that any disclosed length of a spar may be combined with any disclosed width of a foil, each having any disclosed shape.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Additionally, all publications, patents, and patent applications mentioned in this specification are herein incorporated by reference to the same extent as if each individual publication, patent, or patent application was specifically and individually indicated to be incorporated by reference.

What is claimed is:

1. A trailer capable of at least one of launching, retrieving, carrying and storing out of water a V-drive type watersport boat with a non-pivoting propeller and one or more rudders, the trailer configured to be mechanically coupled to a tow vehicle through a tow vehicle hitch and to be electrically coupled to the tow vehicle through a wire connector, the trailer comprising:
   a frame configured to support a V-drive type watersport boat;
   a plurality of wheels, each wheel operably coupled to one of one or more axles configured to moveably support the frame; and
   a controller operatively communicating with a depth sensor disposed proximate one of the one or more axles at a location to protect the depth sensor from damage, the depth sensor being configured to detect if a portion of the trailer is within a predetermined depth range of water appropriate for loading the V-drive type watersport boat onto the frame of the trailer, the depth sensor outputting a signal responsive to water depth at said portion of said trailer;
   wherein the controller is configured to notify a user if the portion of the trailer is within the predetermined depth range of water.

2. The trailer of claim 1, further comprising one or more sound actuators, wherein the controller outputs a signal to one or more of the one or more sound actuators activating an audio indication that the portion of the trailer is within the predetermined depth range of water.

3. The trailer of claim 1, further comprising one or more light sources, wherein the controller outputs a signal to one or more of the one or more light sources activating a visual indication that the portion of the trailer is within the predetermined depth range of water.

4. The trailer of claim 3, further comprising one or more guide poles, wherein at least one of the one or more the light sources is disposed on one of the one or more guide poles.

5. The trailer of claim 1, wherein at least a portion of the depth sensor submerges in the water as the tow vehicle moves the trailer toward the water.

6. The trailer of claim 1, further comprising a transceiver, wherein the transceiver communicates with a portable electronic device to forward a message from the controller to the portable electronic device responsive to the water depth of the portion of the trailer.

7. The trailer of claim 6, wherein the portable electronic device comprises a mobile phone.

8. The trailer of claim 1, wherein the controller electronically communicates with an operator interface of a tow vehicle, the controller providing a message to the operator interface responsive to the water depth of the portion of the trailer.

9. The trailer of claim 1, wherein the depth sensor is configured to detect if the portion of the trailer is submerged below a predetermined depth, and wherein the controller is configured to notify the user when the portion of the trailer is submerged below the predetermined depth.

10. The trailer of claim 1, wherein the depth sensor is configured to detect if the portion of the trailer is above a predetermined depth, and wherein the controller is configured to notify the user when the portion of the trailer is above the predetermined depth.

11. The trailer of claim 1, further comprising one or more cameras that are configured to capture visual data of a view to a rear of the trailer, wherein the visual data captured by the one or more cameras is communicated to a display of a tow vehicle and/or portable electronic device of the user.

12. The trailer of claim 1, further comprising one or more proximity sensors configured to detected if the trailer is within a predetermined distance of an object, person, and/or structure, wherein the controller is configured to communicate data from the one or more proximity sensors to an avoidance system of a tow vehicle.

13. The trailer of claim 1, further comprising:
   one or more bunks supported by the frame and configured to catch a hull of the V-drive type watersport boat; and
   one or more bunk sensors configured to detect if the hull of a watersports vehicle is centered on the trailer.

14. A trailering system for trailering a V-drive type watersport boat with a non-pivoting propeller and one or more rudders, the trailering system comprising:
   a trailer frame operably supported by one or more axles operably supported by wheels with tires, the trailer frame including a front portion, a depth portion, a rear portion opposite said front portion, fenders, and visual brake and turn signals;
   a trailer hitch at said front portion configured to mechanically mate with a tow ball of a tow vehicle;
   a trailer connector at said front portion configured to electrically mate with a connector of the tow vehicle and provide tow vehicle control of said visual brake and turn signals;
   a trailer depth sensor disposed on one of the fenders to protect the trailer depth sensor from damage and proximate one of the one or more axles, the trailer depth sensor configured to output a signal responsive to an estimated depth at which said depth portion of the trailer frame is submerged in water when said trailering system is one of loading or retrieving a V-drive type watersport boat from the water; and
   at least one of an audio and visual indication activated by said signal output from said trailer depth sensor.

15. The trailering system of claim 14, further comprising a load sensor responsive to a position of said V-drive type watersport boat with respect to said trailer frame.

16. The trailering system of claim 14, further comprising loading bunks and a bunk sensor responsive to a lateral position of said V-drive type watersport boat with respect to said loading bunks.

17. The trailering system of claim 14, further comprising a ballast sensor responsive to an amount of water ballast in one or more ballast tanks on said V-drive type watersport boat.

18. The trailering system of claim 14, further comprising a bilge sensor responsive to removal of a bilge plug on said V-drive type watersport boat.

19. The trailering system of claim 14, further comprising one or more boat configuration sensors responsive to a deployment or stowed state of wave shapers on said V-drive type watersport boat.

20. The trailering system of claim 14, further comprising an engine sensor responsive to an engine state of said V-drive type watersport boat.

21. A trailer configured to be used to tow a V-drive type watersport vehicle with a non-pivoting propeller and one or more rudders, the trailer comprising:
   a frame configured to support a V-drive type watersport vehicle, the frame comprising an axle, wheels with tires, and fenders; and
   a controller operatively connected to a depth sensor disposed on a backboard of one of the fenders to protect the depth sensor from damage and proximate the axle, the depth sensor configured to detect when the depth sensor is submerged in water and being disposed at a position on the trailer such that a submersion detection by the depth sensor indicates that the trailer is within a suitable depth of water to launch or load the V-drive type watersport vehicle onto the trailer;
   wherein the controller is configured to notify a user if the trailer is within the suitable depth of water.

22. The trailer of claim 21, further comprising a speaker, wherein the controller is configured to command the speaker to sound an alarm if the trailer is within the suitable depth of water.

23. The trailer of claim 21, further comprising a light source, wherein the controller is configured to command the light source to emit light if the trailer is within the suitable depth of water.

24. The trailer of claim 23, further comprising one or more guide poles, wherein the light source is disposed on the one or more guide poles.

25. The trailer of claim 21, wherein the depth sensor is a float switch.

26. The trailer of claim 21, wherein the position of the depth sensor on the trailer is 22-36 inches off a ground surface.

27. The trailer of claim 21, wherein the position of the depth sensor is such that a top of the depth sensor is approximately 28 inches off a ground surface.

28. The trailer of claim 21, wherein the position of the depth sensor is such that a top of the depth sensor is approximately 30 inches off a ground surface.

* * * * *